US012425293B2

(12) United States Patent
Lal et al.

(10) Patent No.: US 12,425,293 B2
(45) Date of Patent: Sep. 23, 2025

(54) SELF-HEALING NETWORK OF INFRASTRUCTURE PROCESSING UNITS

(71) Applicant: Intel Corporation, Santa Clara, CA (US)

(72) Inventors: Reshma Lal, Portland, OR (US); Pallavi Dhumal, Folsom, CA (US); Shubha Bommalingaiahnapallya, East Brunswick, NJ (US); Asmae Mhassni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 17/544,595

(22) Filed: Dec. 7, 2021

(65) Prior Publication Data

US 2022/0094590 A1 Mar. 24, 2022

(51) Int. Cl.
| | |
|---|---|
| *H04L 41/0668* | (2022.01) |
| *G06F 11/20* | (2006.01) |
| *H04L 41/0604* | (2022.01) |
| *H04L 41/0893* | (2022.01) |
| *H04L 41/0897* | (2022.01) |
| *H04L 41/344* | (2022.01) |
| *G06F 11/14* | (2006.01) |

(52) U.S. Cl.
CPC ........ *H04L 41/0668* (2013.01); *G06F 11/203* (2013.01); *H04L 41/0613* (2013.01); *H04L 41/0893* (2013.01); *H04L 41/0897* (2022.05); *H04L 41/344* (2022.05); *G06F 11/1441* (2013.01)

(58) Field of Classification Search
CPC ............. H04L 41/0668; H04L 41/0613; H04L 41/0893; H04L 41/344; H04L 41/0897; G06F 11/203; G06F 11/1441
See application file for complete search history.

(56) References Cited

U.S. PATENT DOCUMENTS

| | | | |
|---|---|---|---|
| 9,363,141 B1* | 6/2016 | Buckley | ............. H04L 41/0895 |
| 2014/0036924 A1* | 2/2014 | Christenson | ........ H04L 12/4641 |
| | | | 370/395.53 |

(Continued)

OTHER PUBLICATIONS

Press Release, "Intel Unveils the Infrastructure Processing Unit (IPU)", Jun. 15, 2021. (Year: 2021).*

*Primary Examiner* — Brian J. Gillis
*Assistant Examiner* — Chhian (Amy) Ling
(74) *Attorney, Agent, or Firm* — Compass IP Law PC

(57) ABSTRACT

Self-healing networks of Infrastructure Processing Units (IPUs) and associated methods and apparatus. The self-healing IPUs manage other processing units (XPU) clusters by seamlessly migrating the IPU responsibilities to another IPU in the networked environment (e.g., data center) that may be available when an IPU failures or becomes unavailable. A central Resource Manager is used to monitors the health of the IPUs in the data center and in the event of in IPU failure, locates another IPU and assigns it to take over the failed IPU's functions. Replacement and workload migration of a failed XPU in an IPU managed XPU cluster with a remote XPU that is network connected is also supported. The IPU monitors the health of the XPUs in its cluster an informs the Resource Manager of an XPU failure which locates another XPU in the data center and assigns it to the cluster that has the failed XPU.

20 Claims, 15 Drawing Sheets

(56) References Cited

U.S. PATENT DOCUMENTS

2018/0375825 A1* 12/2018 Nataraja ................ H04L 43/10
2019/0042326 A1*  2/2019 Chilikin ............. G06F 9/45558
2021/0092122 A1*  3/2021 Zellweger ........... H04L 63/0807

* cited by examiner

SELF-HEALING NETWORK OF INFRASTRUCTURE PROCESSING UNITS

BACKGROUND INFORMATION

Hardware accelerators, such as Graphics Processing Units (GPUs), Field Programmable Gate Arrays (FPGAs), and Artificial Intelligence (AI) Chips are traditionally connected to a Host Central Processing Unit (CPU) on a server. These and other hardware accelerators including General Purpose GPUs (GP-GPUs), Tensor Processing Units (TPUs), and AI inference units are types of Other Processing Units (collectively termed XPUs). As used herein, a CPU may also comprise an XPU. If the host CPU has a failure making it unusable, then that server becomes unavailable to anyone in the datacenter even if the hardware accelerators attached to it remain functional and are operating correctly. Such a failure results in migrating the entire workload to another server including the parts of the workload that were accelerated on the XPUs.

There is a trend to move the cloud service providers' infrastructure control and management to the IPU (Infrastructure Processing Unit), freeing up the host CPU for compute operations. Also, there is a trend to frontend a cluster of hardware accelerators with IPUs for control and management, with no local host CPU. In these configurations, if the IPU goes down due to some problem, the XPUs would become unavailable even if the resources are healthy and fully functional. This results in poor utilization of those resources.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
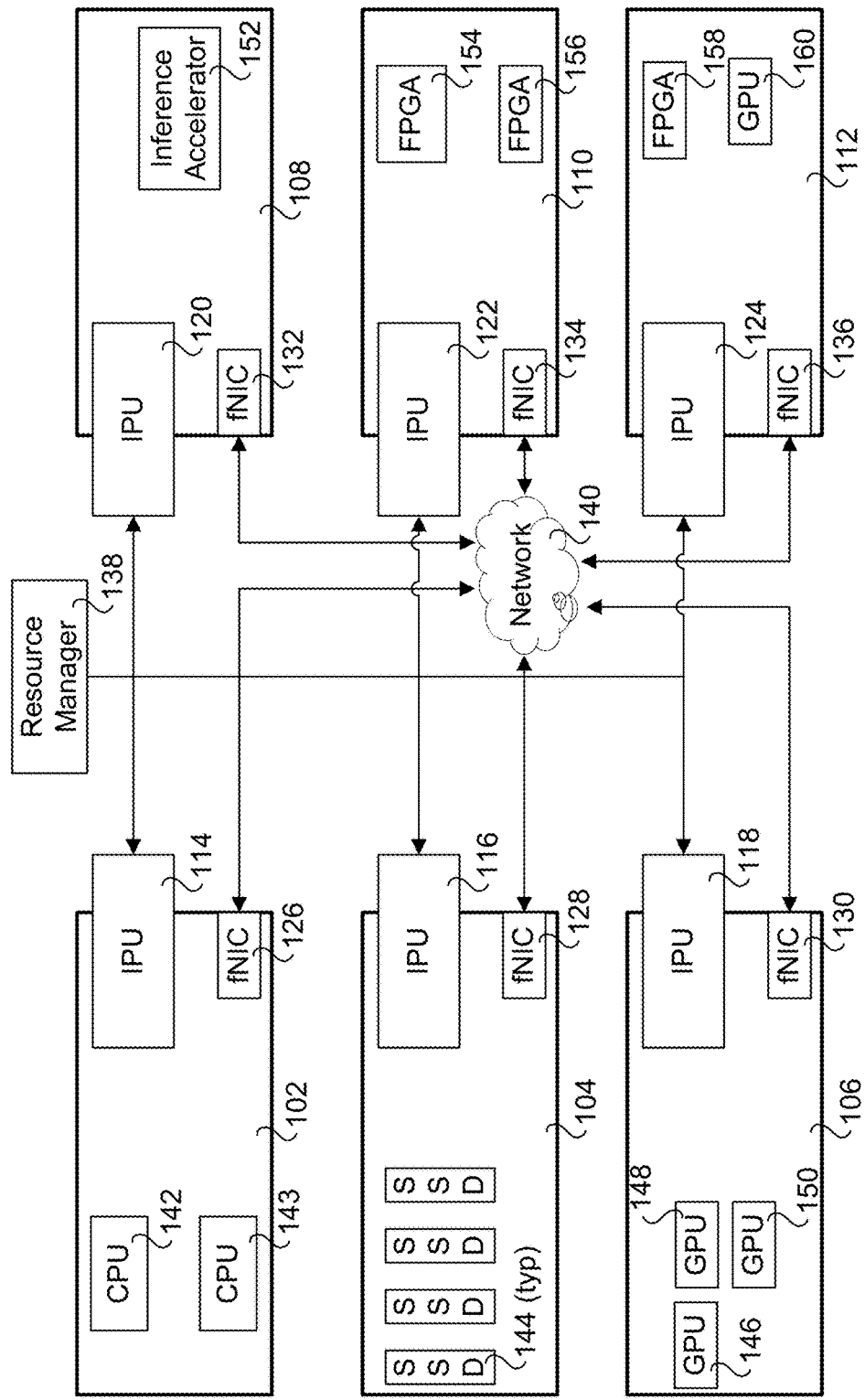
FIG. 1 is a schematic diagram illustrating a network environment in which aspects of the embodiments disclosed herein may be implemented.

Embodiments of self-healing networks of Infrastructure Processing Units (IPUs) and associated methods and apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, solutions employing self-healing networks of IPUs and XPUs are provided. In accordance with aspects of some embodiments, a self-healing IPU network manages XPU clusters by seamlessly migrating the IPU responsibilities to another IPU in a networked environment such as a data center. This is enabled, in part, with the help of a central Resource Manager that monitors health of the IPUs in the data center and in the event of an IPU failure or non-availability, locates another IPU and assigns it to take over the failed IPU's functions.

Under one embodiment, IPUs provide a heartbeat signal or and/or health status message to a central resource manager that maintains a repository or registry of IPUs across the data center, along with their status and other information such as capabilities, available bandwidth, current load, security information etc. If the resource manager does not receive a heartbeat within a specific timeout period, it may try to recover the IPU through resets, software/firmware updates, etc. If the recover attempts fail, it will locate another IPU that can satisfy functional, performance and security requirements that were met by the failed IPU and reallocate the control and management of the XPU cluster attached to the non-functional IPU to this newly assigned IPU. In one aspect, the data center supports IPU disaggregation, allowing a remote IPU to be able to manage the XPU cluster by communicating to the XPUs using a foundational network interface controller (fNIC) attached to the XPUs.

In one embodiment, XPUs communicate with the IPU over a Peripheral Component Interconnect Express (PCIe) interface. If the IPU that is managing the XPU cluster is not locally attached via PCIe, then the foundational NIC encapsulates the PCIe transaction layer packets (TLPs) into network packets and sends them over the network to the remote IPU, where the network packets are depacketized and the PCIe TLPs are decapsulated and delivered to the IPU. Conversely, any control and management commands from the remote IPU to the XPU, such as MMIO commands, come in with PCIe headers. The fNIC will strip of network headers and decapsulate the PCIe TLPs for programming the XPU. This underlying transport is transparent to the XPUs.

The IPU determines the health of the XPU through the status received via the heartbeat and in absence of any heartbeat it considers an XPU to have failed. Note, the failure could also be due to failure in the fNIC but in both cases the XPU has become unavailable and so the IPU's response would be same. The IPU may attempt to recover the XPU or fNIC through resets, software/firmware updates, etc. If the recovery attempts fail, the IPU will locate another XPU with similar capabilities and security to migrate the workload to. If there is no free XPU in its own cluster, the IPU may ask the resource manager to assign it one. The resource manager will locate an XPU in the data center that satisfies the functional and security requirements and assign it to the IPU. The IPU then adds the remote XPU to its cluster and migrates the affected portion of workload to the remote XPU.

In one aspect, IPUs represent the next generation of "smartNICs" with network, acceleration, and compute capabilities. Under some embodiments, control and management of XPUs is performed by an IPU, which is responsible for allocating XPU resources to an application, scheduling the workload and performing other management functions. Under another aspect, an IPU manages a cluster of XPUs that are available for acceleration service to other servers/compute nodes in the data center environment.

As part of this management, IPUs monitor the health of the XPUs in the cluster to detect failures or otherwise conditions under which an XPU is not available. For example, an IPU may employ pings to check the device status or an XPU may send a "heartbeat" signal at periodic intervals indicating its health status. In the event of a XPU failure, which may be detected if the heartbeat is not received or in the absence of a ping's return, the IPU will ask a central resource manager for another comparable XPU (that is, an XPU with the same or similar compute/accelerator resources as the XPU that has failed). For example, the central resource manager could allocate a remote network connected XPU to the IPU. The IPU will then add that to its cluster of XPUs and take on control and management of the remote XPU and start monitoring the health of the remote XPU via heartbeat signals and/or health status messages sent by the XPU or via regular pings from the IPU. Once the remote XPU is configured and initialized, the IPU will migrate the workload from the failed XPU to the remote XPU.

The XPUs are compute resources that are managed by IPUs. They may communicate with an IPU over a standard or proprietary Input/Output (I/O) interface, such as but not limited to PCIe. The XPUs convey their health and status to IPUs via heartbeats or by responding to pings from the IPU. Optionally, they may have a basic NIC or foundational NIC to enable being accessed directly over the network.

The resource manager is a central entity that functions as a central resource registry and is responsible for the maintaining IPU and (optionally) XPU configuration and capability information and for monitoring the health of IPUs.

The resource manager employs facilities for IPU health management and recovery. It monitors the health of IPUs by receiving heartbeat signals and status updates from the IPUs or by sending regular pings to the IPUs. The absence of a heartbeat from a given IPU (or non-reply to a ping of the given IPU) is used by the resource manager to detect IPU failures. In response to such a failure, the resource managers may try to help recover from the IPU failure via reset or updates to the IPU, but in some cases an IPU may not be recoverable. In the event of a IPU failure that is not recoverable, the resource manager will allocate an available and healthy IPU in the datacenter to take over some or all of the functions of the failed IPU, such as control and management of an XPU cluster that was originally assigned to the failed IPU.

The resource manager also is used to facilitate replacement of a failed XPU in cluster. If a XPU has non-recoverable failure, the IPU which is managing that XPU will request the resource manager to assign another XPU that is available in the data center with similar capabilities (e.g., compute resources, security, etc.). The resource manager may maintain a repository and status of all XPUs in the data center and locate a free XPU from using its repository or it may ask the IPUs in the data center if anyone has an idle XPU that can be used to replace the functionality/acceleration services provided by the failed XPU. If it locates such an XPU, it will assign it to the requesting IPU and perform the necessary configuration changes to make the new XPU part of the requesting IPU cluster. From this point on, the IPU starts managing the new XPU and may migrate an active workload from the failed IPU to the new XPU.

A foundational NIC (or fNIC) is a NIC that is attached to the XPU cluster and serves as a proxy for a remote IPU in the event the local IPU becomes unavailable. When the local IPU is functional, the fNIC is not in the path of control and management interface between the local IPU and XPUs. However, when the local IPU fails, the fNIC operates as a failover resource that facilitates the communication of control and management commands between XPUs and remote IPUs. In one aspect, an fNIC does this by encapsulating the PCIe (or other standard or propriety I/O protocol) requests in network packets and sending the network packets over the network to the remote IPU that may be managing the XPUs and encapsulating PCIe TLPs containing the network payload received from the remote IPU into and network packets and forwarding them to the XPU.

FIG. 1 shows a network environment 100 illustrating exemplary implementations of the foregoing components. Environment 100 includes six compute nodes (aka compute platforms) 102, 104, 106, 108, 110, and 112, each including a respective IPU 114, 116, 118, 120, 122, and 124, and a respective fNIC 126, 128, 130, 132, 134, and 136. IPUs 114, 116, 118, 120, 122, and 124 are coupled in communication with a resource manager 138. fNICs 126, 128, 130, 132, 134, and 136 are coupled to a network 140. Communication between resource manager 138 and 114, 116, 118, 120, 122, and 124 may also employ network 140 or a separate management network (not shown), or otherwise use out-of-band (OOB) communication links or channels that are used for management purposes (also not separately shown).

Compute nodes 102, 104, 106, 108, 110, and 112 are illustrative of various types of compute platforms/servers, blades, etc. and other compute resources that are deployed in networked environments such as data centers in the like. The physical structures of environment may vary, but will generally include various compute resources that are installed in racks that that are interconnected by network cables and the like. The environment may employ architectures under which compute nodes have similar resources, as well as disaggregated architectures under which compute resources of different types may be pooled.

Compute node 102 is illustrated of a multi-socket compute platform, including a pair of CPUs (aka sockets) 142 and 143. Compute nodes may also comprise single socket platforms, or may not employ any host processors/CPUs.

Compute node 104 is illustrative of a storage node, as depicted by solid-state drives (SSDs) 144. Generally, in addition to SSDs, storage nodes may employ other non-volatile storage devices, such as NVDIMMs (Non-volatile Dual In-line Memory Modules) devices and hybrid memory devices such as 3D Crosspoint® DIMMs.

Compute node 106 is illustrative of a compute node employing XPUs comprising GPUs or GP-GPUs, as depicted by GPUs 146, 148, and 150. The GPUs may employ different structures, including GPU chips and peripheral cards (e.g., PCIe cards) having one or more GPUs. The GPUs may be programmed with various languages, including but not limited to CUDA.

Compute node 108 is an example of a compute node used for accelerating machine learning (ML) or AI operations, and includes an inference accelerator 152. Similar ML or AI compute nodes may employ Tensor Processing Units (TPUs) and/or peripheral cards with TPUs, as well as other types of ML or AI accelerators.

Compute node 110 is an example of an XPU accelerator compute platform employing one or more FPGAs, such as depicted by an FPGA 154 and an FPGA 156. As described and illustrated below, an IPU may also include substantial FPGA resources.

Compute node 112 is an example of a compute platform employing a mixture of XPUs, as depicted by an FPGA 158 and a GPU 160. Other types of XPUs may also be implemented on a compute platform employing a mixture of XPUs.

In addition to the components shown for compute nodes 102, 104, 106, 108, 110, and 112, the compute nodes would also include other components that are not shown for simplicity and clarity, such as memory device, firmware storage devices, I/O devices, etc. As described and illustrated below, IPUs 114, 116, 118, 120, 122, and 124 will also include integrated network interfaces (e.g., NICs) and include various compute and accelerator resources, such as but not limited to FPGAs and accelerator IP (Intellectual Property) blocks. Also, selected compute nodes may include various software and firmware components, including support for implementing virtualized compute architectures, such as Type1 and Type2 hypervisors/Virtual Machine Monitors (VMMs) and container-based architectures.

Figure 2A:
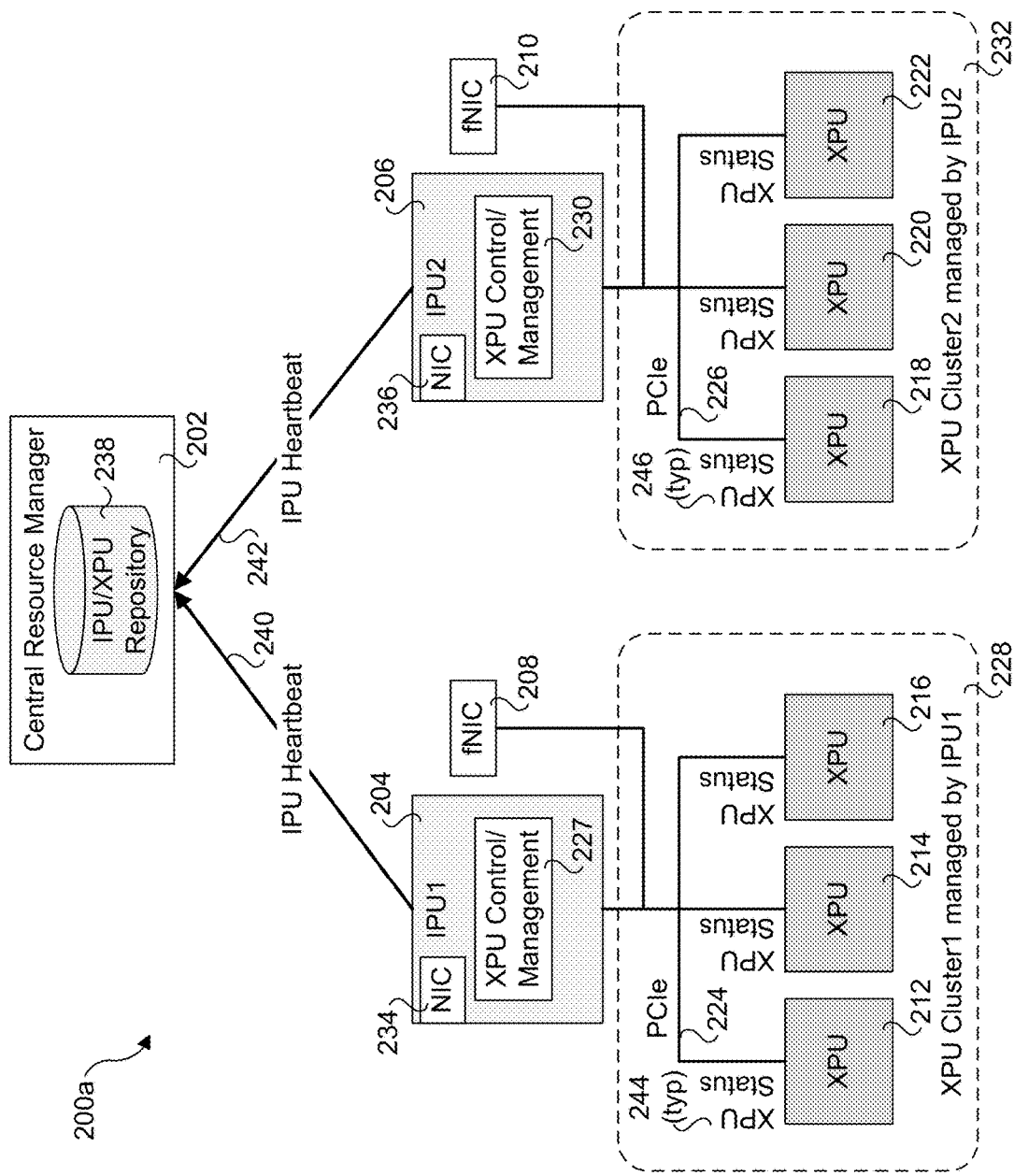
FIG. 2*a* is a schematic diagram illustrating an example of a healthy system.

FIG. 2a shows an example of a healthy system 200a including a central resource manager 202 that is communicatively coupled to a pair of IPUs 204 and 206 (also respectively labeled and referred to as IPU1 and IPU2). Each of IPUs 204 and 206 are in a compute node that includes a respective fNIC, as illustrated by fNICs 208 and 210. Generally, fNICs do not have a role in the control/management between IPU and XPUs in a healthy system, but are used when an IPU fails, as described below.

IPU 204 is coupled to XPUs 212, 214, and 216. Similarly, IPU 206 is coupled to XPUs 218, 220, and 222. In this example, communication between IPUs and XPUs is facilitated by PCIe links, as depicted by PCIe links 224 and PCIe links 226. Other standardized and proprietary I/O links and associated protocols may also be used, including but not limited to Compute Express Link (CXL) links.

IPU 204 includes an XPU control/management block 227 including logic to manage a first XPU cluster 228 comprising XPUs 212, 214, and 216. Similarly, IPU 206 includes an XPU control/management block 230 that includes logic to manage a second XPU cluster 232 comprising XPUs 218, 220, and 222. IPUs 204 and 206 further include one or more NICs, such as shown by a NIC 234 for IPU 204 and a NIC 236 for IPU 206.

As described above, resource manager 202 maintains a repository of IPUs across the data center, along with their status and other information such as capabilities, available bandwidth, current load etc. In some embodiments, the same or a separate repository may also be maintained by a resource manager that includes status and other information for XPUs. Under the illustrated embodiment, resource manager 202 maintains a combined IPU/XPU repository 238, observing the repositories for the IPUs and XPUs may be separate. Alternatively, XPU capabilities and other information is separately maintained by the IPUs or may be obtained through fNICs, as described below.

Under the illustrated embodiment, IPU 204 periodically sends an IPU heartbeat 240 to resource manager 202, while IPU 206 periodically sends an IPU heartbeat 242 to resource manager 202. As discussed above, an IPU may be connected to a resource manager via a network used for data traffic, a network used for management purposes (and not used for data traffic) or an OOB communication link or OOB channel. When IPU heartbeats are used, resource manager 202 includes facilities such as countdown timers that are used to detect whether or not an IPU heartbeat signal is received within a predefined timeout period programmed for the countdown timers. When a IPU heartbeat from a given IPU and associated countdown timer is received, the countdown time is reset. If an IPU heartbeat is not received within the predefined timeout period, the countdown timer will expire, indicating an IPU fault or failure.

As also discussed above, a resource manager may periodically ping an IPU. In the event the IPU fails to return a ping response, the IPU is detected to have failed. The ping may employ any of the data traffic network, management network, or OOB communications link/channel.

As further shown in FIG. 2a, XPUs 212, 214, and 216 periodically send an XPU status signal or message 244 to IPU 204. Similarly, XPUs 218, 220, and 222 periodically send an XPU status signal or message 246 to IPU 206. In one embodiment, status signals/messages 244 and 246 are heartbeat signals. In other embodiments, additional information may be provided with an XPU status message, such as XPU telemetry data. As an option, an IPU may use pings or read a status register XPU to detect the health of an XPU in lieu of using XPU status signals/messages.

Figure 2B:
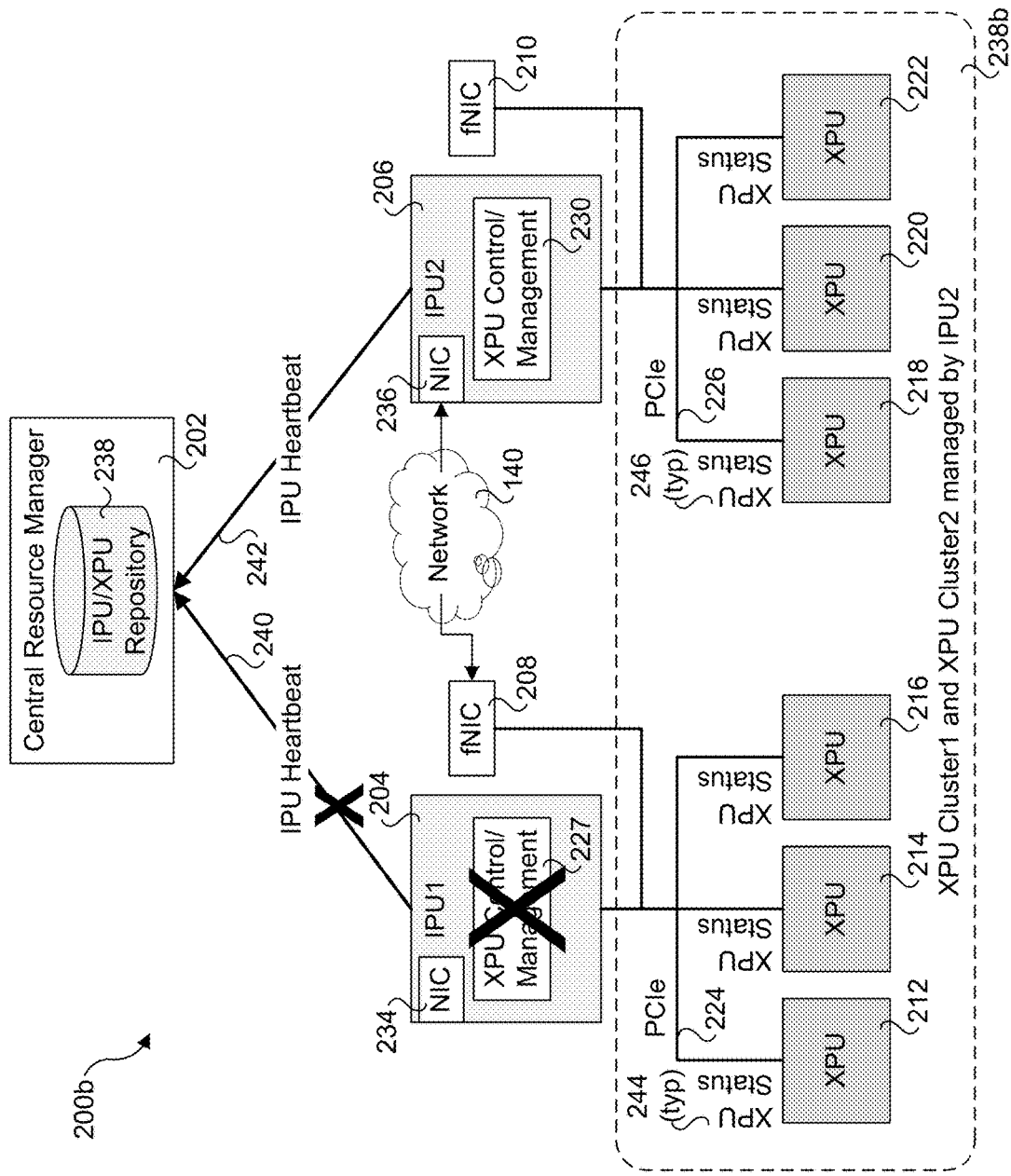
FIG. 2*b* is a schematic diagram illustrating an example of an IPU migration from a failed IPU1 to IPU2.

FIG. 2b shows a compromised system 200b under which IPU 204 has failed. In connection with failing, IPU 204 will fail to send IPU heartbeat 240, which will be detected by resource manager 202. In response to detecting that IPU 204 has failed, resource manager 202 will select another comparable IPU to take over the operations previously performed by the failed IPU. For example, in one embodiment a comparable IPU may have similar capabilities and security provisions. In this example, the selected IPU is IPU 206.

Resource manager 202 will then migrate the workload of failed IPU 204 to IPU 206. This will include providing IPU 206 with applicable information relating to the workload that was handled by IPU 204, including identity of XPUs 212, 214, 216 and other information relating to these XPUs that are stored in IPU/XPU repository 238. Resource manager 202 will further provide IPU 206 with the network address (e.g., IP and/or MAC address) for fNIC 208, and could optionally include some workload information, such as the memory location for a work descriptor ring or the like. As shown by dashed outline 238b, following the IPU migration IPU2 (206) now manages both XPU Cluster1 and XPU Cluster2.

Figure 3A:
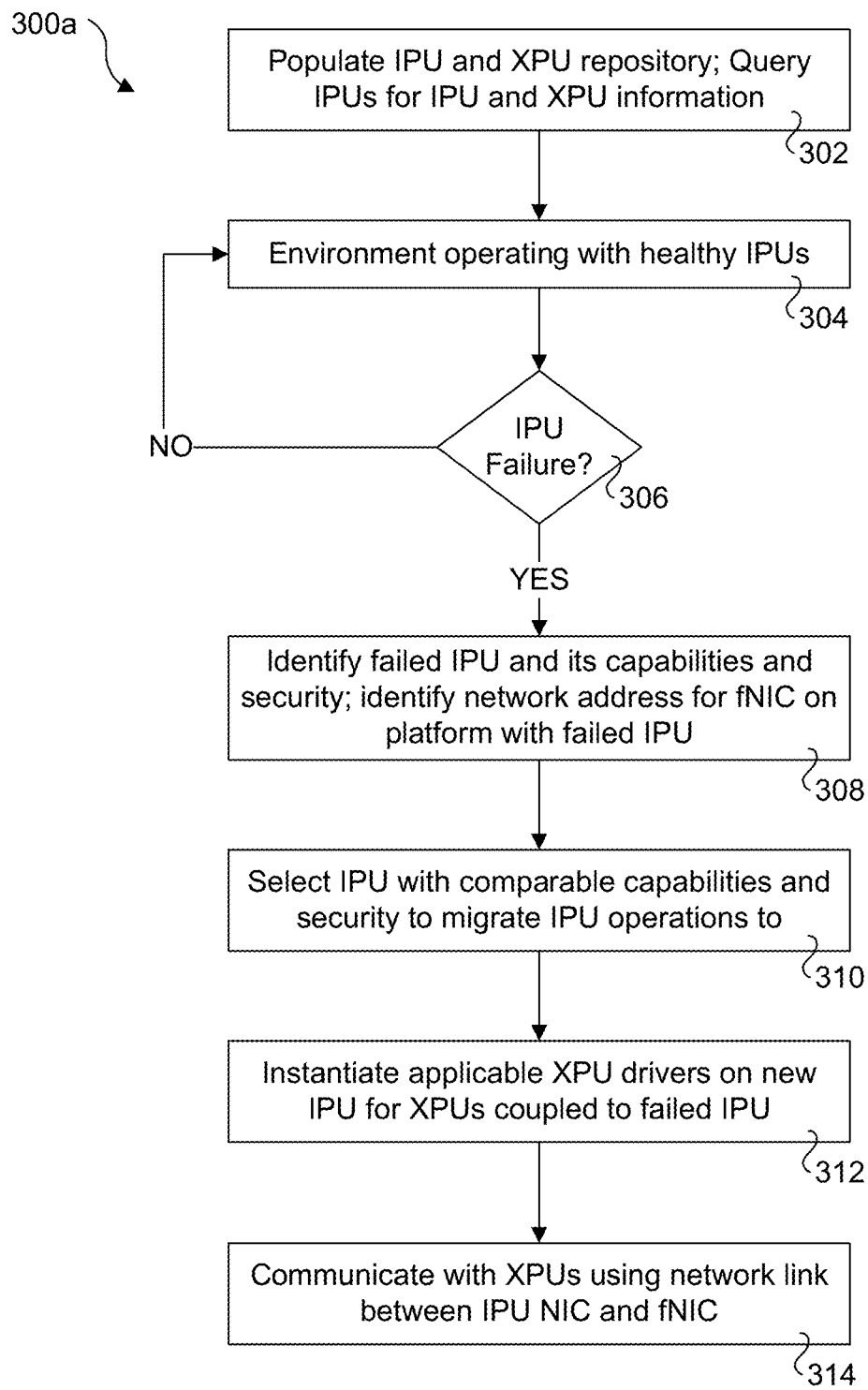
FIG. 3*a* is a flowchart illustrating operations performed by a resource manager and a new IPU to facilitate migration of IPU operations from a failed IPU to the new IPU.

FIG. 3a shows a flowchart 300a illustrating operations performed by resource manager 202 and IPU 206 to facilitate migration of IPU operations from IPU 204 to IPU 206. During environment initialization, Resource manager 202 populates IPU/XPU repository 238 with IPU and XPU information, as shown in a block 302. As part of compute platform and IPU initialization, an IPU will enumerate its XPU devices and obtain applicable configuration and capabilities information. For an embodiment employee PCIe links, PCIe enumeration is employed. For other I/O interconnect protocols, I/O endpoint device enumeration based on that/those protocols may be employed.

During initialization, resource manager 202 will identify the IPUs under its management. This can be obtained using various means, such as broadcasting a request over a management network to various devices coupled to the network to identify themselves (by responding to the broadcast message). Under another approach, the IPUs register with the resource manager, providing applicable IPU and (optionally) XPU configuration. In other cases, the information may be manually configured. Having identified the IPUs being managed by a resource manager, the resource manager may query the IPUs for additional configuration/capabilities/security information. In addition, a IPU may provide various configuration and capabilities information for the XPUs connected to it. The information obtained from the IPUs is then used to populate IPU/XPU repository 238.

In a block 304, the environment begins operating with healthy IPUs. As depicted by a decision block 306, a determine is made to whether an IPU failure has occurred. As described above, this determination may be made using IPU heartbeat signals or pinging the IPUs. As depicted by the loop back to block 304, the determination in decision block 306 is repeated (e.g., on a periodic basis).

Upon detection of an IPU failure, the logic proceeds to a block 308 in which the failed IPU is identified, along with its capabilities and security information. Also, the network address for the fNIC on the platform with the failed IPU is identified. In addition to IPU/XPU information, a resource manager may also maintain platform configuration information, such as information mapping IPUs and fNICs to compute platforms.

In a block 310 the resource manager selects an IPU with comparable capabilities and security to the failed IPU, and begins to migrate IPU operations to the selected IPU. As shown in a block 312, the IPU migration includes instantiating applicable XPU drivers on the new IPU for the XPUs coupled to the failed IPU—under on embodiment, the XPU drivers to be instantiated may be identified based on the IPU migration information obtained from the resource manager.

As shown in a block 314 and in FIG. 2b, the new IPU (206) communicates with the XPUs on the failed IPU (204) using a network link from NIC 236 to fNIC 208 via network 140. Details of how the communication between an IPU and remote XPUs are implemented are shown below in FIG. 4.

Figure 9:
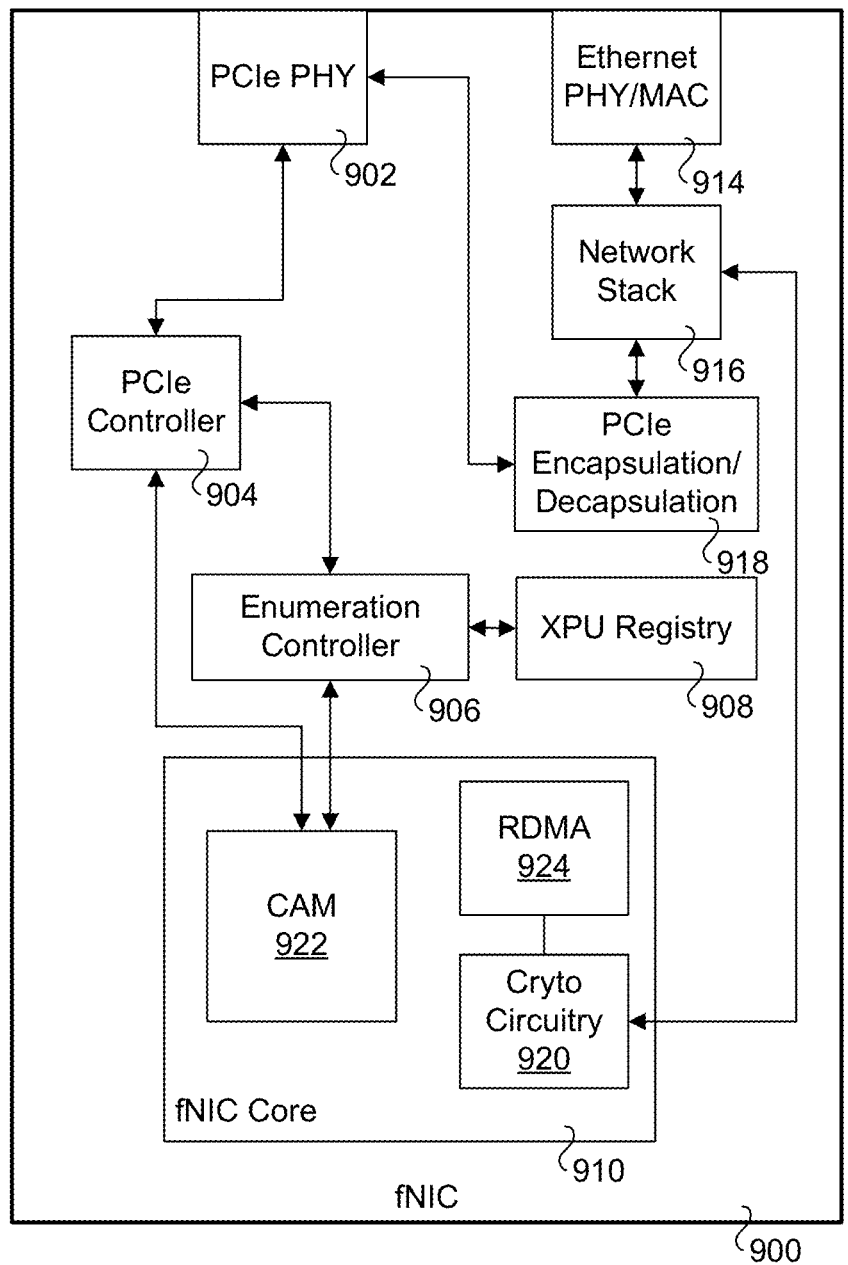
FIG. 9 is a block diagram of an fNIC, according to one embodiment.

Under an alternative approach where the central resource manager maintains an IPU repository but does not maintain an XPU repository (or otherwise maintains limited information concerning XPUs), an fNIC may include logic for detecting which XPUs are connected to it, and provide address information for those XPUs to the new IPU. For example, under the PCIe configuration illustrated in FIGS. 2a and 2b, each fNIC 208 and 210 will include a PCI controller that is capable of enumerating PCIe endpoint devices and applicable PCIe interconnect structure in accordance with one or more PCIe specifications. Enumeration of PCIe endpoint devices and interconnect structure is a standard function performed by a PCI controller or the like. Similar I/O device endpoint enumeration may be provided using other I/O protocols. Further details of an fNIC supporting this functionality is illustrated in FIG. 9 and described below.

Figure 3B:
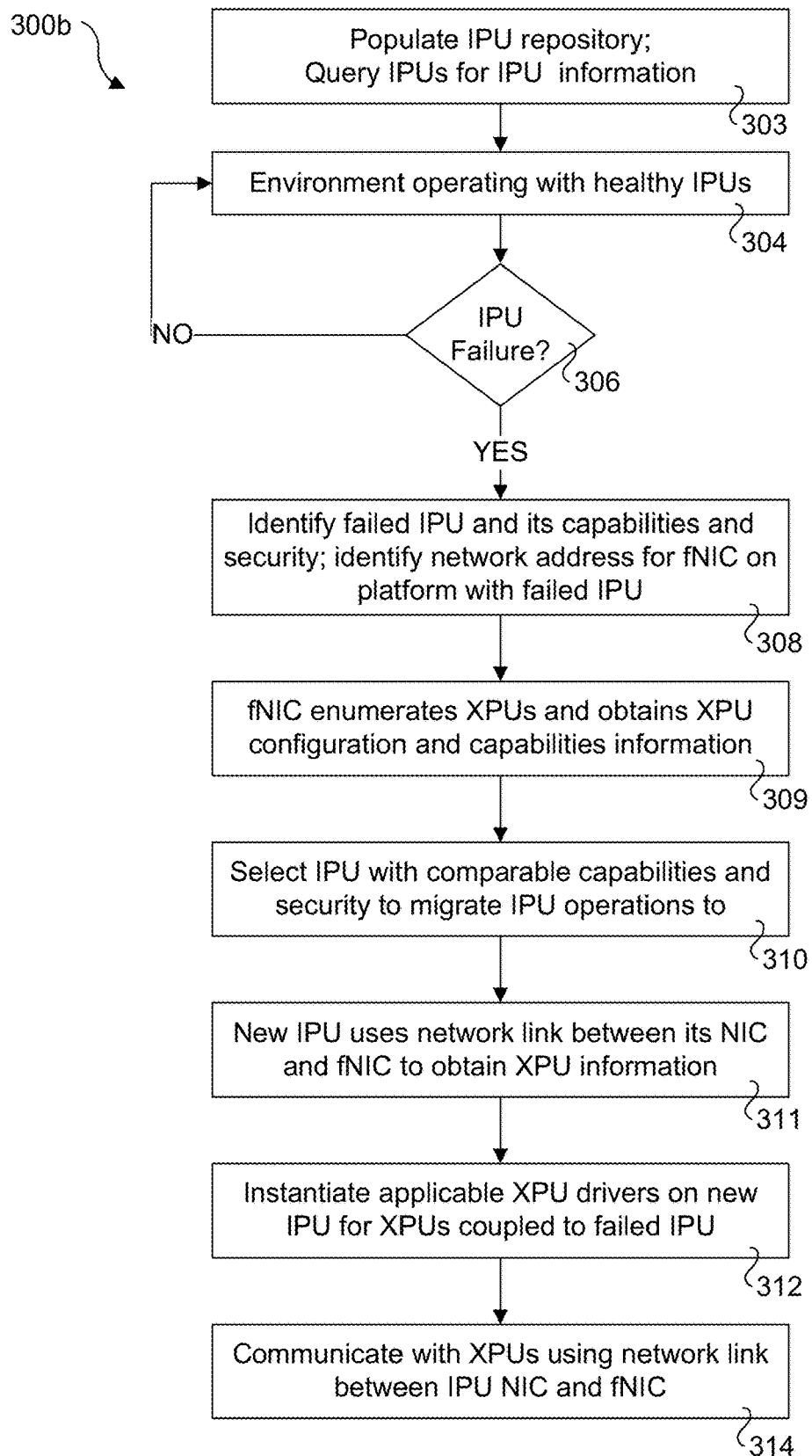
FIG. 3*b* is a flowchart illustrating operations performed under an alternative approach in which a fNIC provides XPU configuration information to a remote IPU.

FIG. 3b shows a flowchart 300b illustrating operations performed under this alternative approach, where like-numbered blocks in FIGS. 3a and 3b perform similar operations. In a block 303, resource manager 202 populates an IPU repository with IPU information. This is similarly to that described for block 302 in FIG. 3a, except only the IPU information is maintained in the IPU repository.

The operations in block 304, decision block 306 and block 308 are the same as described above. In a block 309, the fNIC enumerates the XPUs to which it is attached and obtains XPU configuration and capabilities information. Generally, these operations could be performed in connection with an IPU failure, or done as part of the platform initialization.

Following the operations in block 310, in a block 311 the new IPU uses the network link between its NIC and the fNIC on the platform with the failed IPU to obtain XPU information gathered from the XPUs in block 309 above. With the XPU information in hand, the applicable XPU drivers are instantiated on the new IPU in block 312, and in block 314 and the new IPU (206) communicates with the XPUs on the failed IPU (204) using the network link from NIC 236 to fNIC 208 via network 140.

As part of the migration of the failed IPU 204 workload, IPU 206 will need to interact with remote XPUs 212, 214, and 216. As illustrated in FIG. 2b, this communication employs a path including a network link between NIC 236 and fNIC 208 using network 140, and PCIe links 224 coupled XPUs 212, 214, and 216 to fNIC 208.

Figure 4:
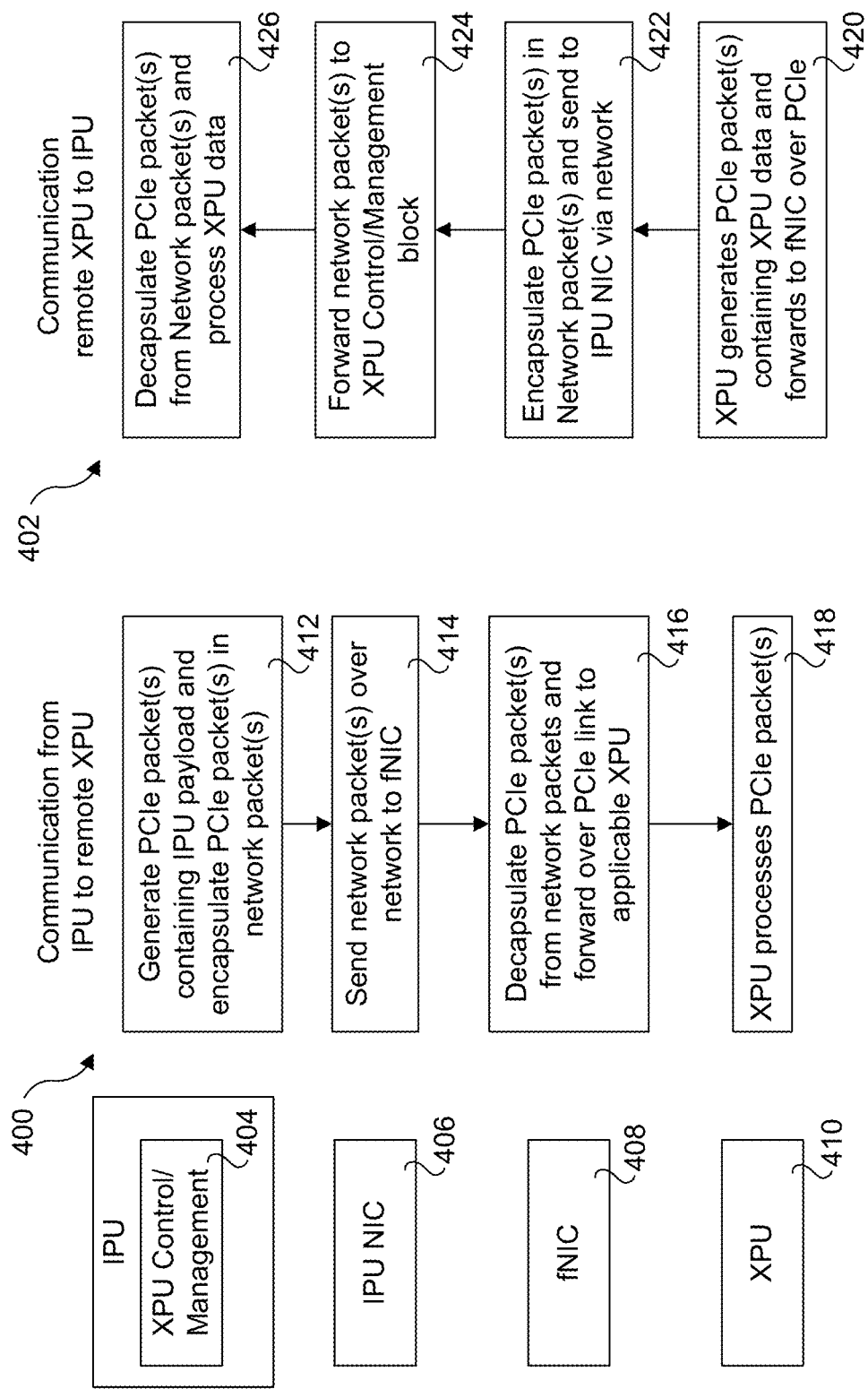
FIG. 4 shows two flowcharts illustrating operations performed to support communication from an IPU to a remote XPU and from a remote XPU to an IPU.

Flowcharts 400 and 402 in FIG. 4 respectively show operations to support communication from an IPU to a remote XPU and operations to support communication from a remote XPU to an IPU. The components involved in these communications include XPU control/management logic 404 (inside the IPU), an IPU NIC 406, an fNIC 408, and an XPU 410. In these examples communication between fNIC 408 and XPU 410 is facilitated by a PCIe link employing an associated PCIe protocol. More generally, the PCIe link and protocol are illustrative of other types of I/O links and associated protocols that may be implemented in a similar manner.

As shown in flowchart 400, in a block 412, XPU control/management logic 404 generates one or more PCIe TLPs containing an IPU payload to be sent to a XPU 410 and encapsulated one or more PCIe TLPs in one or more network packets. The IPU payload may include control and management commands (such as command for programming a register), as well as other commands and data associated with IPUs. The PCIe TLPs may include a PCIe destination address corresponding a memory buffer accessible to XPU 410 or a destination address for the XPU 410 itself, depending on what the data will be used for. The network packet(s) is/are forwarded from XPU control/management logic 404 to IPU NIC 406, e.g., by using a DMA transfer to queue the network packet(s) in an transmit queue for an applicable port on IPU NIC 406.

Next, in a block 414 IPU NIC 406 sends the network packet(s) over the network to fNIC 408. Upon receipt of a network packet, fNIC 408 decapsulates any PCIe TLP(s) encapsulated in the network packet and forwards the PCIe TLP(s) to an applicable XPU (XPU 410 in this instance) or applicable memory buffer using the PCIe destination address in the PCIe TLP(s). Upon receipt of the one or more PCIe TLPs, the XPU processes the packet(s), as shown in a block 418.

As shown in flowchart 402, communication from a remote XPU to an IPU traverses the reverse path, beginning in a block 420 where XPU 410 generates one or more PCIe TLPs containing a payload for an XPU and forwards the PCIe TLP(s) to fNIC 408 over a PCIe link. The XPU payload may include but is not limited to commands to program XPU, read/write to XPU, etc. In connection with handling an accelerator workload, an XPU may employ work descriptors and completion indicia or the like and in some instances an fNIC may be configured to read completion indicia and use a PCIe DMA Read operation to read associated data in a memory buffer and DMA that data to the fNIC. In addition, Remote DMA (RDMA) operations may also be supported.

In a block 422, fNIC 408 encapsulates the PCIe TLP(s) in one or more network packets and sends the network packets to IPU NIC 406 via the network. As shown in a block 424, upon receipt of the network packets IPU NIC 406 will forward the packets to XPU control/management logic 404, where the PCIe TLP(s) will be decapsulated from the network packet(s) and the XPU data will be processed in a block 426. As an alternative, decapsulation of the PCIe TLPs from the network packets may be performed by IPU NIC 408, and the decapsulated PCIe TLPs would be forwarded to XPU control/management logic 404.

Figure 5A:
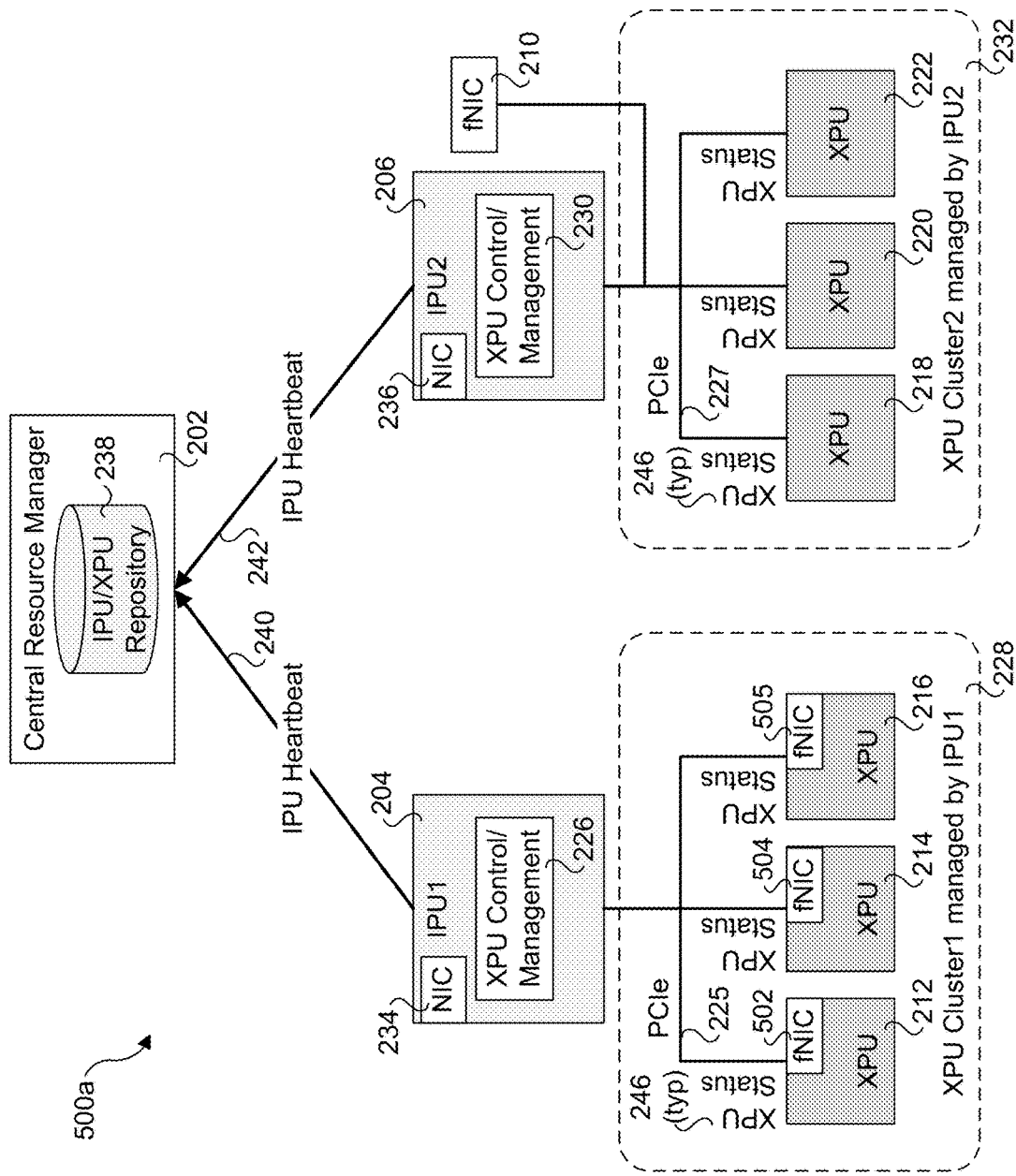
FIG. 5*a* is a schematic diagram illustrating a healthy system with an alternative implementation under which XPUs includes a respective embedded fNIC.

FIG. 5a shows a healthy system 500a with an alternative implementation under which XPUs 212, 214, and 216 includes respective embedded fNICs 502, 504, and 506. The other components illustrated in FIG. 5a are similar to like-numbered components shown in FIG. 2a as discussed above. Additionally, healthy system 500a and healthy system 200a generally operate in a similar manner (when healthy).

Figure 5B:
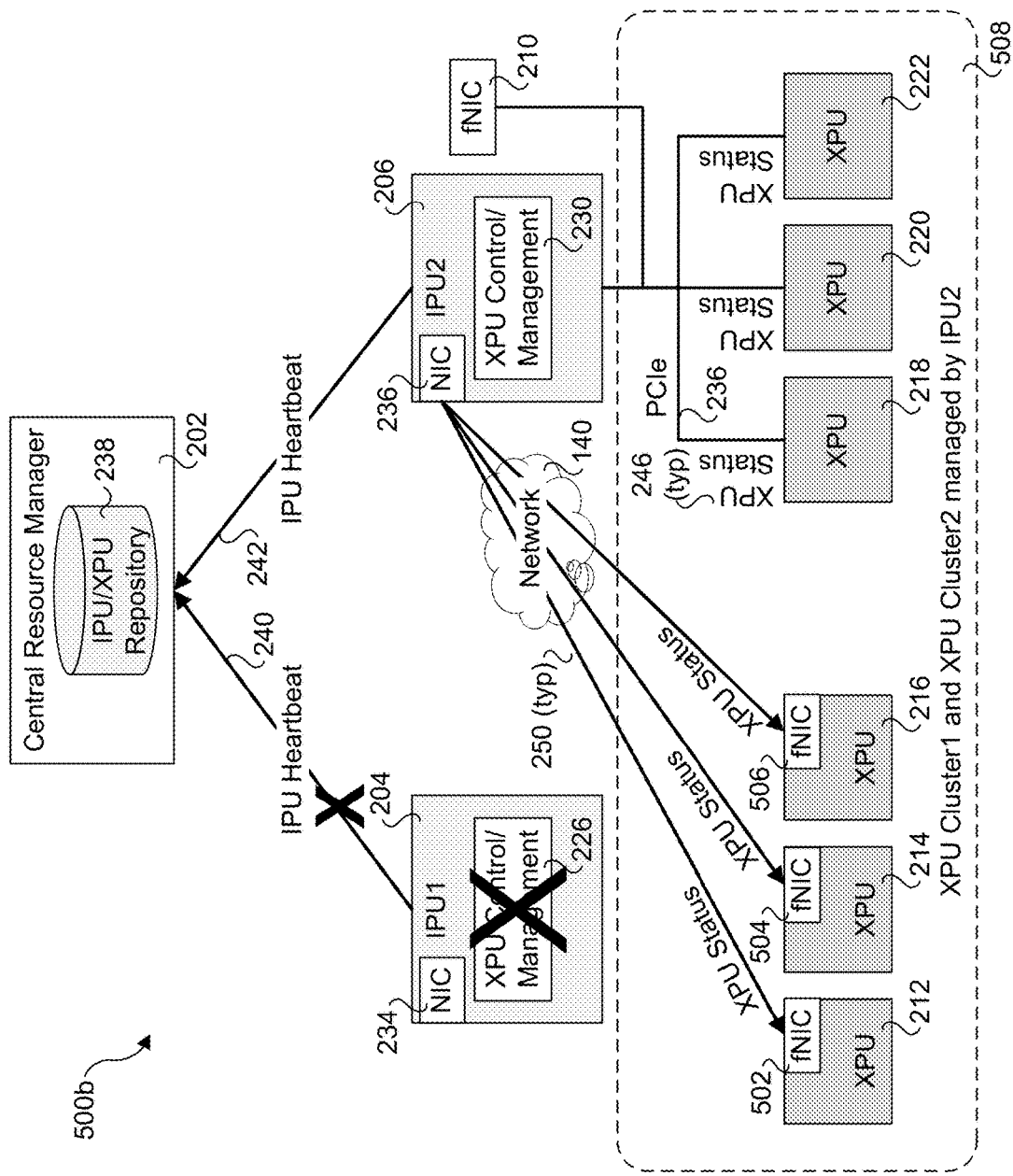
FIG. 5*b* is a schematic diagram illustrating how an IPU failure and migration is handled under the alternative implementation of FIG. 5*a*, according to one embodiment.

FIG. 5b shows a reconfigured system 500b under which IPU 204 has failed and its IPU operations for XPUs 212, 214, and 216 have been migrated to IPU 206. Most of the IPU migration operations for reconfigured system 200b and 500b are similar, except under reconfigured system 500b communication for XPUs 212, 214, and 216 respectively employs fNICs 502, 504, and 506, each of which is connected to NIC 236 on IPU 206 via a network link 250 over network 140. As before, XPU status may employ XPU heartbeat signals that would be sent from fNICs 502, 504, and 506 to NIC 236 or by IPU pings to fNICs 502, 504, and 506, as illustrated in FIG. 5b. As further shown by a dashed box 508, following the IPU migration both XPU Cluster1 and XPU Cluster2 are managed by IPU2 (206).

Figure 6:
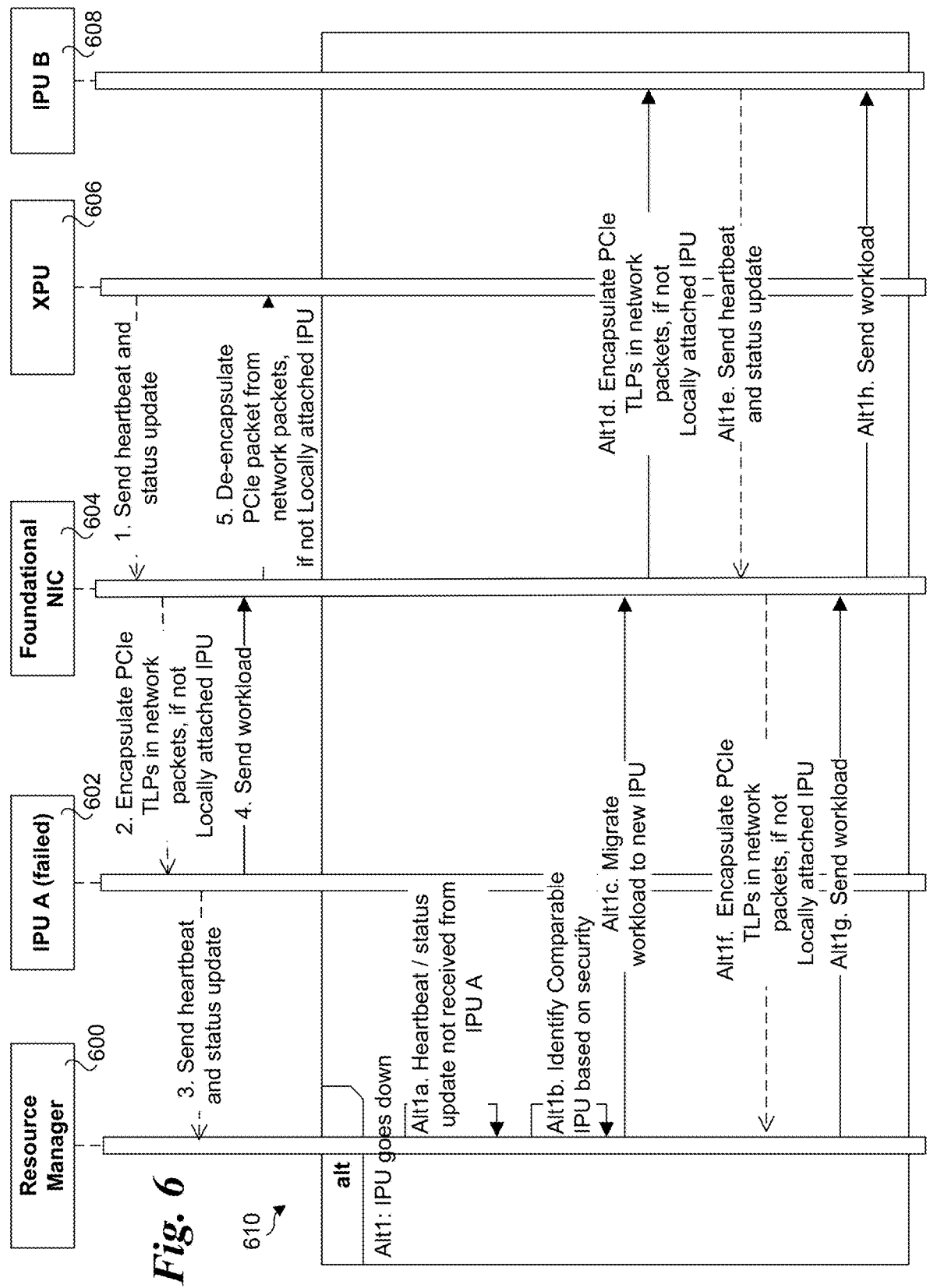
FIG. 6 is a message flow diagram illustrating operations and message flows associated with a self-healing IPU flow, according to one embodiment.

FIG. 6 shows a message flow diagram illustrating operations and message flows associated with a self-healing IPU flow, according to one embodiment. The messages are transferred between a resource manager 600, a failed IPU 602 (IPU A), a foundational NIC 604, an XPU 606, and an IPU 608 (IPU B). As a pre-step, all IPUs in the data center will register with resource manager 600.

The upper portion of FIG. 6 illustrates message exchanges under a healthy system. At this point in time, IPU 602 has yet to fail. As shown by a first operation 1, XPU 606 sends a heartbeat and status update message to foundational NIC 604. In operation 2, if the destination IPU is not locally attached, the PCIe TLPs are encapsulated in network packets and sent from foundation NIC 604 to IPU 602. If XPU 606 and IPU 602 are on the same platform, XPU 606 will send heartbeat and status updates in PCIe messages that are sent to IPU 602 of a PCIe link (not shown).

In operation 3, IPU 602 sends a heartbeat and status message to resource manager 600. As discussed above, this is performed periodically. In operation 4, IPU A sends a workload to foundational NIC 604. If XPU 606 is not locally attached to IPU 602, the PCIe TLPs are decapsulated from the network packets, as shown by operation 5.

The lower portion of FIG. 6 in the "alt" block 610 shows operations and messages that are performed when an IPU goes down (in this example IPU B). As discussed above, if an IPU fails, it will fail to send a heartbeat and status update to the resource manager. This event is depicted by Alt1a, where resource manager 600 has not receive a heartbeat/status update from IPU A prior to the heartbeat countdown timer expiring. As depicted by operation Alt1b, if resource manager 600 is not able to recover IPU 602 through resets or updates, it locates a comparable IPU B from its registry and checks its availability to take over management of XPUs that were managed by IPU A. In locating the replacement IPU it will ensure it meets the necessary functional, security and performance needs.

Next, resource manager 600 will migrate the workload to the new IPU. This will entail providing applicable information such as IP address of the remote fNIC(s), XPU cluster information, etc., to the newly assigned IPU B. It will also facilitate establishing secure and authenticated communication channel between the IPU B and the remote fNIC(s).

As shown in operation Alt1c, migration of the workload to new IPU B begins by forwarding information to IPU B via foundational NIC 604. As before, if the IPU is not locally attached, PCIe TLPs are encapsulated in network packets and sent over the network. In operation Alt1e, IPU b sends a heartbeat and status update message to resource manager 600 via foundation NIC 604. If the IPU is not a local IPU, foundation NIC 604 will encapsulate the PCIe TLPs in network packets, as shown in operation Alt1f. As shown in operations Alt1g. and Alt1h, resource manager 600 sends the workload to IPU B via foundation NIC 604.

In addition to the illustrated operations, IPU B configures the remote fNIC to forward the PCIe TLPs from XPUs to IPU B and on unpacking the network payload from the IPU B and relaying PCIe TLPs to the XPUs. Also, IPU B takes over control and management of the remote XPU cluster such that they continue to be available and can be assigned as needed to run the datacenter workloads can be assigned to run on them and they continue to be available. fNIC makes the communication with the remote IPU transparent to XPUs so no change in needed to operate in this new configuration.

Figure 5C:
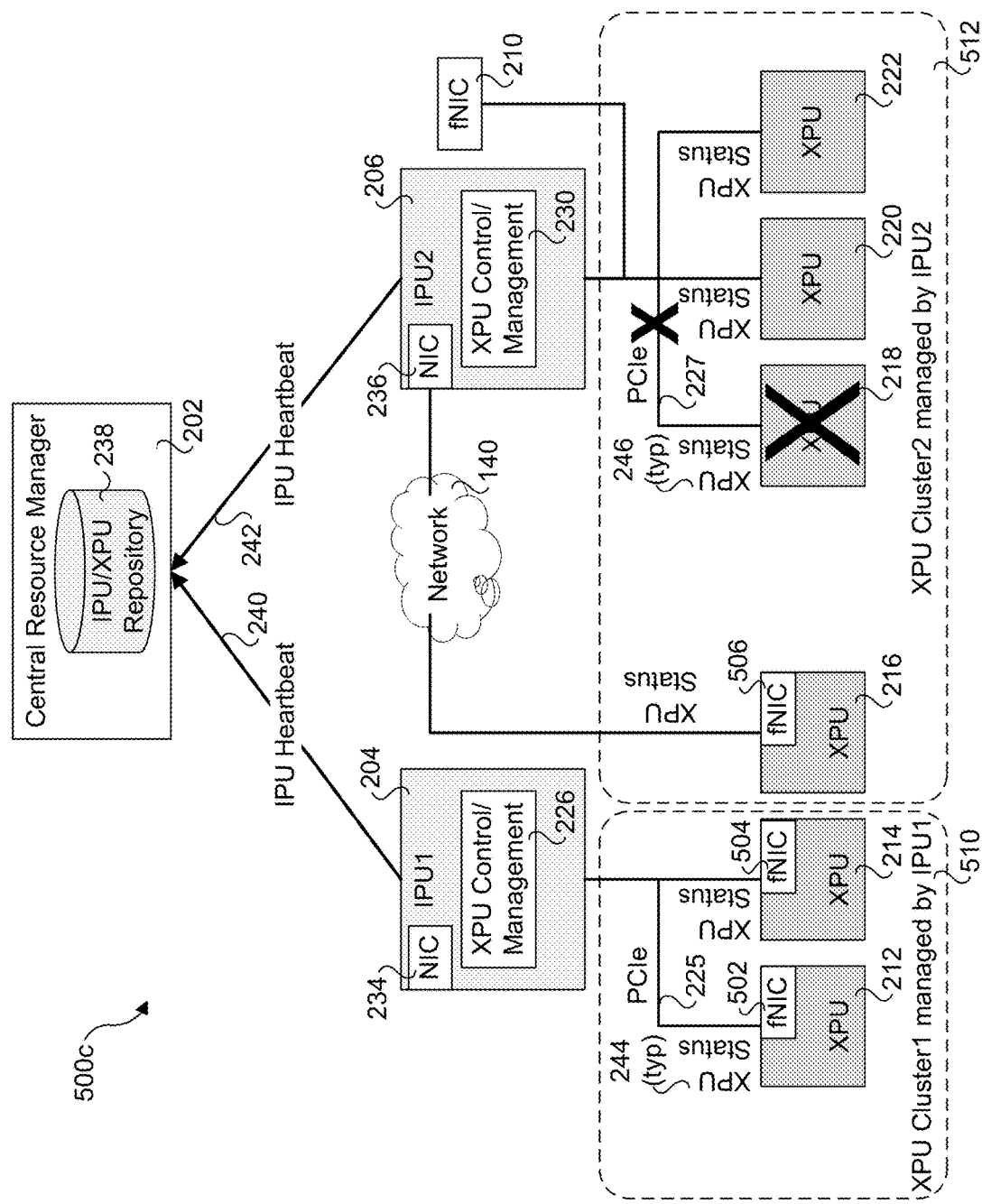
FIG. 5*c* is a schematic diagram illustrating an example of an XPU failure and replacement of the XPU with a remote XPU under which the remote XPU is added to the XPU cluster of the failed XPU, according to one embodiment.

Under another aspect of some embodiments, a failed XPU can be replaced by a healthy XPU having comparable capabilities and security. An example of this is illustrated under system configuration 500c and FIG. 5c. As before, like-numbers components in FIGS. 5a and 5c perform similar operations. Under this embodiment, the healthy system configuration is shown in FIG. 5a, as before.

At some point, XPU 218 in XPU Cluster2 will fail, resulting in its failure to send XPU status updates to IPU 206. This will be detected by XPU control/management block 230 in IPU 206, which will then send a message to resource manager 202 asking the resource manager to identify an available IPU in the datacenter having comparable capabilities and security as failed XPU 218. Resource manager 202 will look up available XPUs meeting the criteria in IPU/XPU repository 238 and return applicable information including the identity of the replacement XPU (XPU 216) and the network address of fNIC 506. IPU 206 will then access replacement XPU 216 via a network link between fNIC 506 and NIC 236 over network 140.

Figure 7:
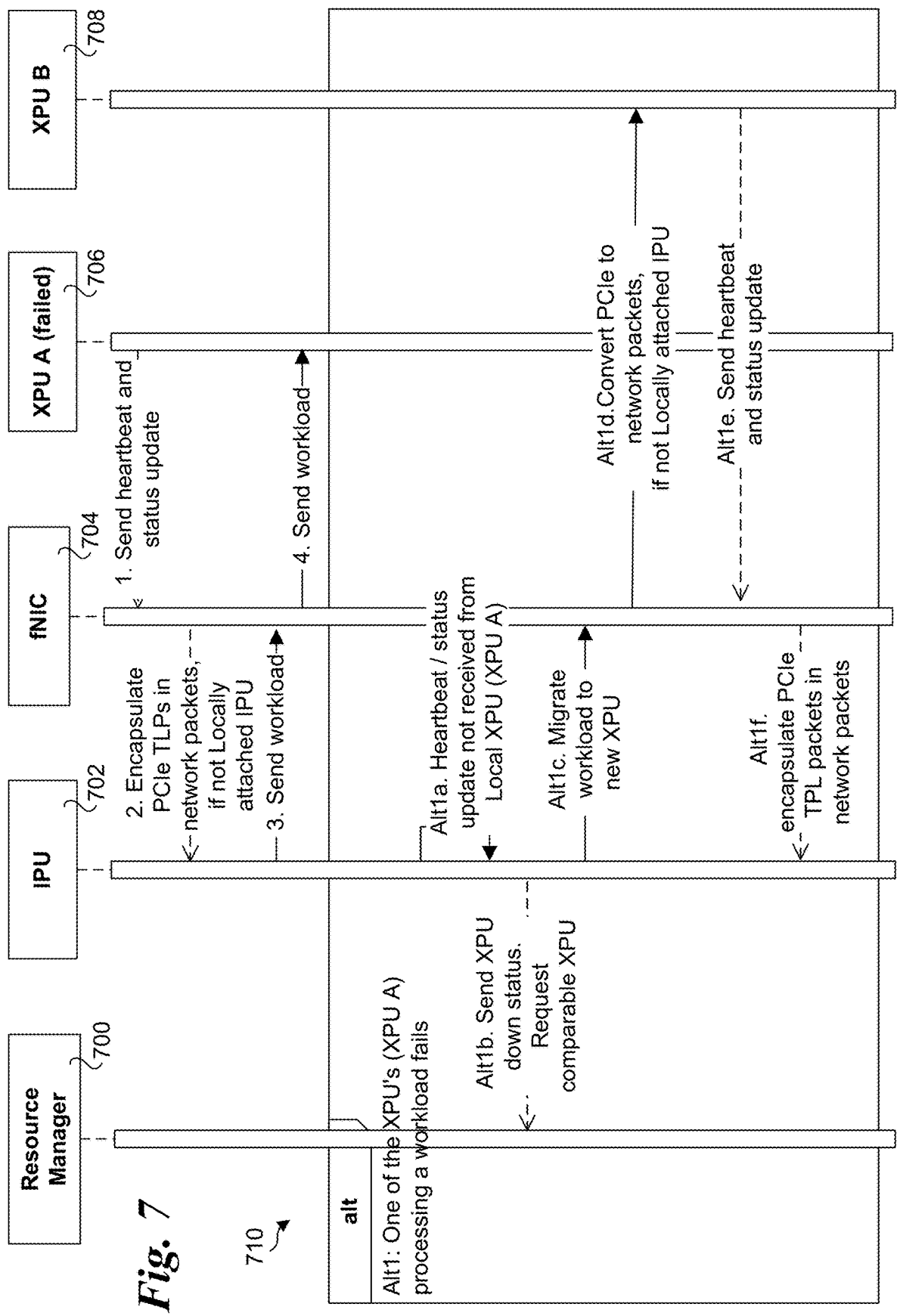
FIG. 7 is a message flow diagram illustrating operations and message flows associated with a self-healing XPU flow, according to one embodiment.

FIG. 7 shows a message flow diagram illustrating operations and message flows associated with a self-healing XPU flow, according to one embodiment. The components exchanging messages include a resource manager 700, and IPU 702, a an fNIC 704, an XPU A (706) and an XPU B (708). Initially, XPU A is operating normally and periodically sends heartbeat and status updates to IPU 702 that is managing it. The IPU may be local or remote, but that is transparent to the XPUs. In this example, the heartbeat and status update messages sent from XPU A during a first operation 1 are forwarded to IPU 702 via fNIC 704. In operation 2, the PCIe TLP packet(s) for the heartbeat and status update message are encapsulated in network packets if IPU 702 is not a locally attached IPU. As depicted in operations 3 and 4, IPU 702 sends a workload to XPU A via fNIC 704.

The remaining operations depicted in "alt" block 710 illustrate operations and messages that are performed/exchanged in response to XPU A fails. If IPU 702 detects a non-recoverable failure in XPU A due to a missing heartbeat from XPU A and not able to revive it with a reset or software/firmware updates, it starts the process of replacing XPU A. As shown in operation Alt1a, failure of XPU A is detected by IPU 702 by it not receiving a heartbeat and status update message from XPU A within prior to the heartbeat countdown timer expiring. The flow further presumes that the reset or software/firmware updates fail to enable XPU A to recover.

As part of the replacement of XPU A, IPU 702 will attempt to locate another XPU within its cluster of XPUs to migrate the existing workload. If it does not have one available locally, IPU requests the resource manager to assign a comparable one. As shown in operation Alt1b, IPU 702 sends an XPU status down message to resource manager 700 along with a request to assign a comparable XPU. As discussed above, a resource manager may maintain its own repository of XPUs in the data center and find one or may send requests to IPUs in the data center to determine if any IPUs have a comparable XPU available. If the resource manager finds a comparable XPU (e.g., XPU B in the FIG. 7) it responds to the requesting IPU with an IP address and other information regarding XPU B. It will also facilitate establishing a secure and authenticate channel between IPU 702 and XPU B.

IPU reconfigures XPU B and adds it to its own cluster. It then migrates the workload from the XPU A to XPU B, as depicted in operation Alt1c. Communication between IPU and XPU B is facilitated the fNIC in XPU B clusters which encapsulates/decapsulates the PCIe TLPs for network packets that are transferred between XPU B and remote IPU, as depicted by operations Alt1d and Alt1f. As shown by operations Alt1e and Alt1f, replacement XPU B sends it heartbeat and status update messages to IPU 702 via fNIC 704, which encapsulates the PCIe TLP packet(s) in network packets that are transferred between fNIC 704 and IPU 702.

Figure 8:
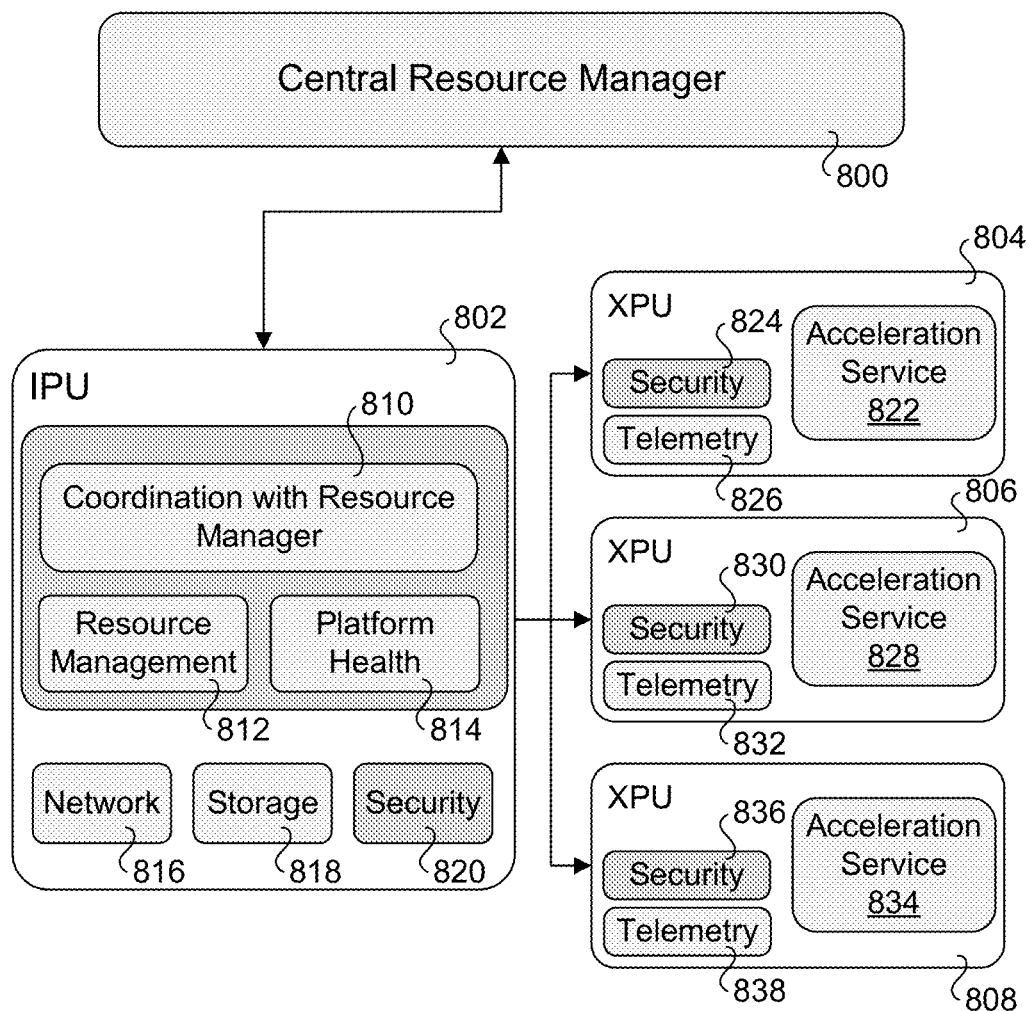
FIG. 8 is a schematic block diagram of a system illustrating functional aspects of an IPU and XPUs, according to one embodiment.

FIG. 8 shows a diagram illustrating exemplary function provided by an IPU and XPUs, according to one embodiment. The illustrated components include a central resource manager 800, and IPU 802, and XPUs 804, 806, and 808. IPU 802 includes a block 810 that provides functions relating to coordination with resource manager 800, such as setting up communication links/channels, providing health and status updates, and receiving information from resource manager 800 relating to migration/replacement of an IPU or XPU.

A resource management block is used for management of resources managed by the IPU, such as XPUs 804, 806, and 808 in this example. Non-limiting examples of resource management includes configuring the XPU, assigning its resources to applications as needed, scheduling workloads to run on the XPU, etc. A platform health block 814 is used to obtain and store health information relating to various platform components, including XPUs 804, 806, and 808 and IPU 802.

IPU 802 further includes a network block 816, storage block 818, and security block 820. Network block 816 generally supports network functions, including packet processing operations described elsewhere herein. Storage block 818 is a generic representation of various storage functions performed by IPU 802, such as but not limited to NVME or NVMEoF (NVME over Fabric). Security block 820 supports various security aspects of IPU 802, such as provisioning keys, attesting an XPU to ensure it is running authenticated firmware, etc.

XPU 804 includes an acceleration service 822, a security block 824, and a telemetry block 826. Similarly, XPU 806 includes an acceleration service 828, a security block 830, and a telemetry block 832, and XPU 808 includes an acceleration service 834, a security block 836, and a telemetry block 838. Acceleration services 822, 828, and 834 are illustrative of various types of accelerators services that may be provided by an XPU. Generally, an acceleration service performs accelerator workloads that are offloaded from a host CPU. In addition, a given XPU may support one or more acceleration services.

In some embodiments, an application or service workload may be distributed across CPUs and XPUs using a microservice architecture under which some of the microservices are executed in software on a CPU(s) while other microservices are implemented as hardware (HW) microservices that are offloaded to an XPU or multiple XPUs, where the HW microservices comprise offloaded acceleration (micro) services. As with other acceleration services, the HW microservices may be migrated when a failure or unavailability of an XPU is detected.

Security blocks 824, 830, and 836 are representative of security functions and capabilities for an XPU. Exemplary security functions as associated security components include secure boot, device keys, cryptographic modules/configurations, etc. As described above, in some embodiments a replacement XPU is selected that has comparable security to the security provided by the XPU being replaced.

Telemetry blocks 826, 832, and 838 are used to generate telemetry data, including health information for an XPU. The telemetry data may be used for various purposes, including providing data relating to performance and availability of an acceleration service.

FIG. 9 shows selected blocks for an exemplary fNIC 900. As illustrated in this example, fNIC 900 includes a PCIe PHY 902, which can refer to a physical (PHY) layer of the PCIe connection that includes digital logic that prepares packets (e.g., TLPs) for serial transmission on a communication link (and reversing that process for inbound packets) as well as an electrical analog interface that connects to the communication link and consists of differential drivers and receivers for each lane. The PCIe PHY 902 is coupled to a PCIe controller 904 that manages the PCIe interface to devices that are connected to fNIC 900 over a PCIe link, such as XPUs in the embodiments herein.

fNIC 900 further includes an enumeration controller 906 to manage a process of detecting external devices (such as XPUs) connected fNIC 900. For example, in some embodiments, enumeration controller 906 implements PCIe enumeration operations in accordance with one of more PCIe protocols. Such PCIe enumeration operations are used to identify PCIe endpoint devices (e.g., XPUs, as well as PCIe interconnect structures). Enumeration control 906 stores XPU configuration, capabilities, and security information gathered during PCIe enumeration in an XPU registry 908.

fNIC 900 also includes an fNIC core 910 having compute functionality, memory, transport functionality, and cryptographic functionality. In one embodiment, fNIC core 910 can be referred to herein as core circuitry.

In one embodiment, PCIe controller 904 supports a Config Bypass mode. The Config Bypass mode may refer to a mode where all PCIe TLPs, including configuration (config) TLPs (also referred to herein a configuration packets or configuration cycle packets), are sent to the fNIC core 910, and not terminated in the PCIe controller 904 on the fNIC 900. The config TLPs may be utilized by enumeration controller 906 to generate mappings of one or more of the XPU IDs, bus device function, and/or address(es) mapped to a BAR (Base Address Register).

fNIC 900 also includes circuitry to facilitate communication over a network, such as but not limited to Ethernet in the illustrated example. The circuitry includes an Ethernet PHY/MAC (Media Access Channel) block 914 that performs PHY and MAC layer functions for one or more Ethernet standards. The network circuitry also includes a network stack block 916 and a PCIe encapsulation/decapsulation block 918. Network stack block 916 perform function relating to network communication involving layers above the PHY and MAC layer, such as IP layer, TCP, and security features implemented in other network layers.

PCIe encapsulation/decapsulation block 918 is used to encapsulate PCIe TLPs to be sent outbound onto the network from a network port coupled to Ethernet PHY/MAC block 914 (not shown) and to decapsulate encapsulated PCIe TLPs from network packets received from the network at the network port. This functionality enables a remote IPU to communicate with an XPU attached to fNIC 900 using PCIe TLPs that are encapsulated in network packets, as described and illustrated above.

In embodiments herein, fNIC 900 includes device security features, such as secure boot. Additionally, fNIC 900 includes additional security features, such as being able attest a remote IPU using standard attestation protocol, such as Security Protocol Data Model (SPDM), and being able to cryptographically protect communication with the remote IPU using protocol such as IPSeC.

In one embodiment, fNIC 900 can perform an attestation protocol with a remote IPU. In one embodiment, cryptographic circuitry 920 of fNIC core 910 may manage the attestation process with a remote IPU. Upon successful attestation, shared secret keys are established. This may be done via standard protocols, such as, but not limited to Diffie Hellman or SPDM.

In one embodiment, the fNIC core 910 can include a lookup table, such as content addressable memory (CAM) 922, that matches a key (e.g., XPU ID, bus device function, and/or address mapped to a BAR) to a network address of a destination remote IPU or to a locally attached XPU. In one example, a PCIe {Bus, Device, Function} or process address space ID (PASID) is mapped to an RDMA queue pair (QP) in the CAM 922. The fNIC core 910 may also include an RDMA backend 924, that encapsulates the PCIe TLPs in a transport and sends the encapsulated TLP over an RDMA transport to the targeted remote IPU as determined based on the CAM 922 table lookup. Alternately, in some embodiments, other transports, such as TCP, may be used over any type of communication media.

As noted above, the fNIC 900 may perform an attestation process with the remote IPU. During this attestation process, the remote IPU can provide an attestation report to the fNIC 900 that allows fNIC 900 to verify that the remote IPU is a genuine IPU and is untampered. In addition to providing device authenticity info, the remote IPU may provide measurements and/or version numbers of firmware running on the IPU as part of attestation report. The remote IPU can also support for cryptographic protection of data transfers with the fNIC 900, such as through establishment and use of a virtual private network (VPN) link.

Figure 10:
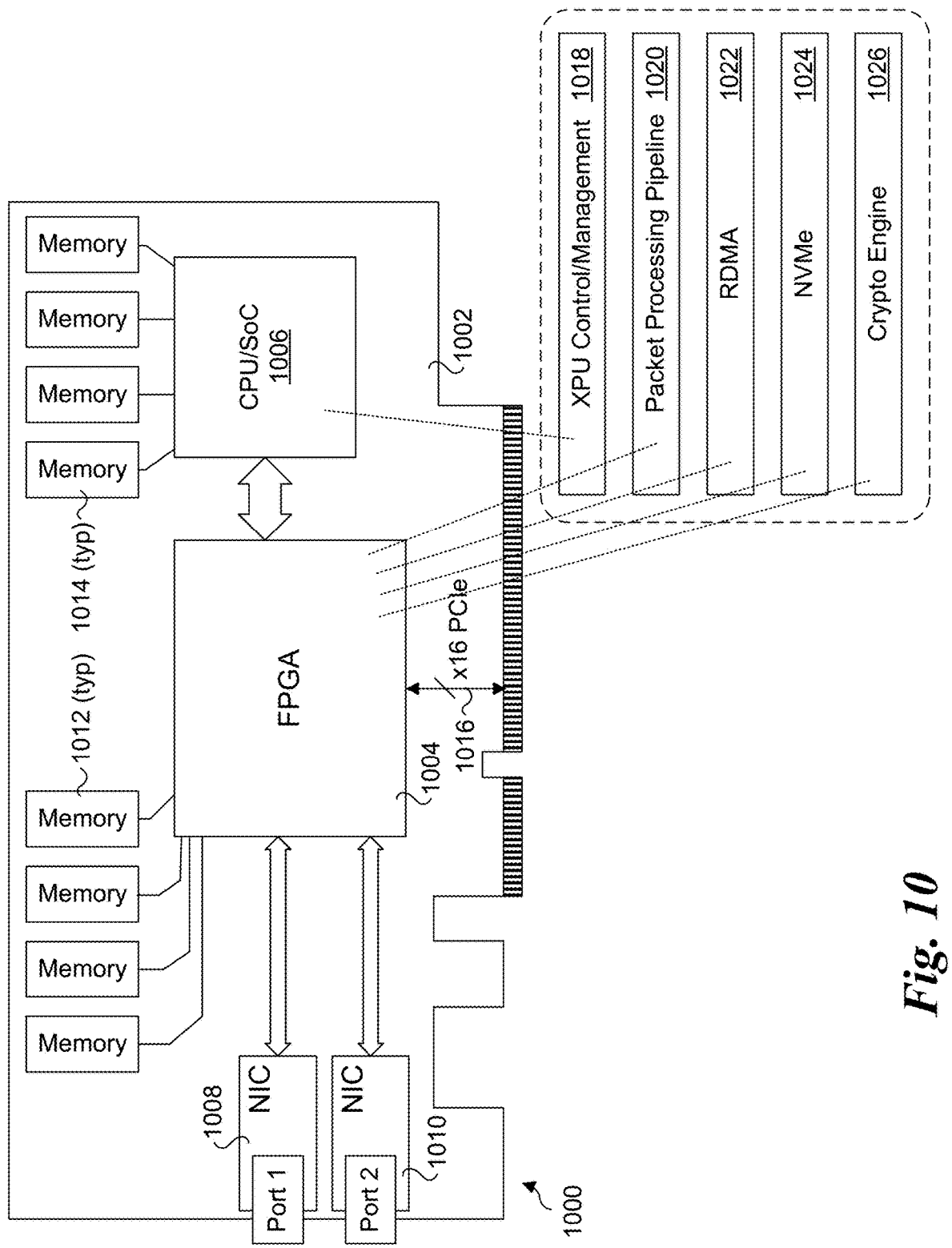
FIG. 10 is schematic diagram of a first exemplary IPU.
Figure 11:
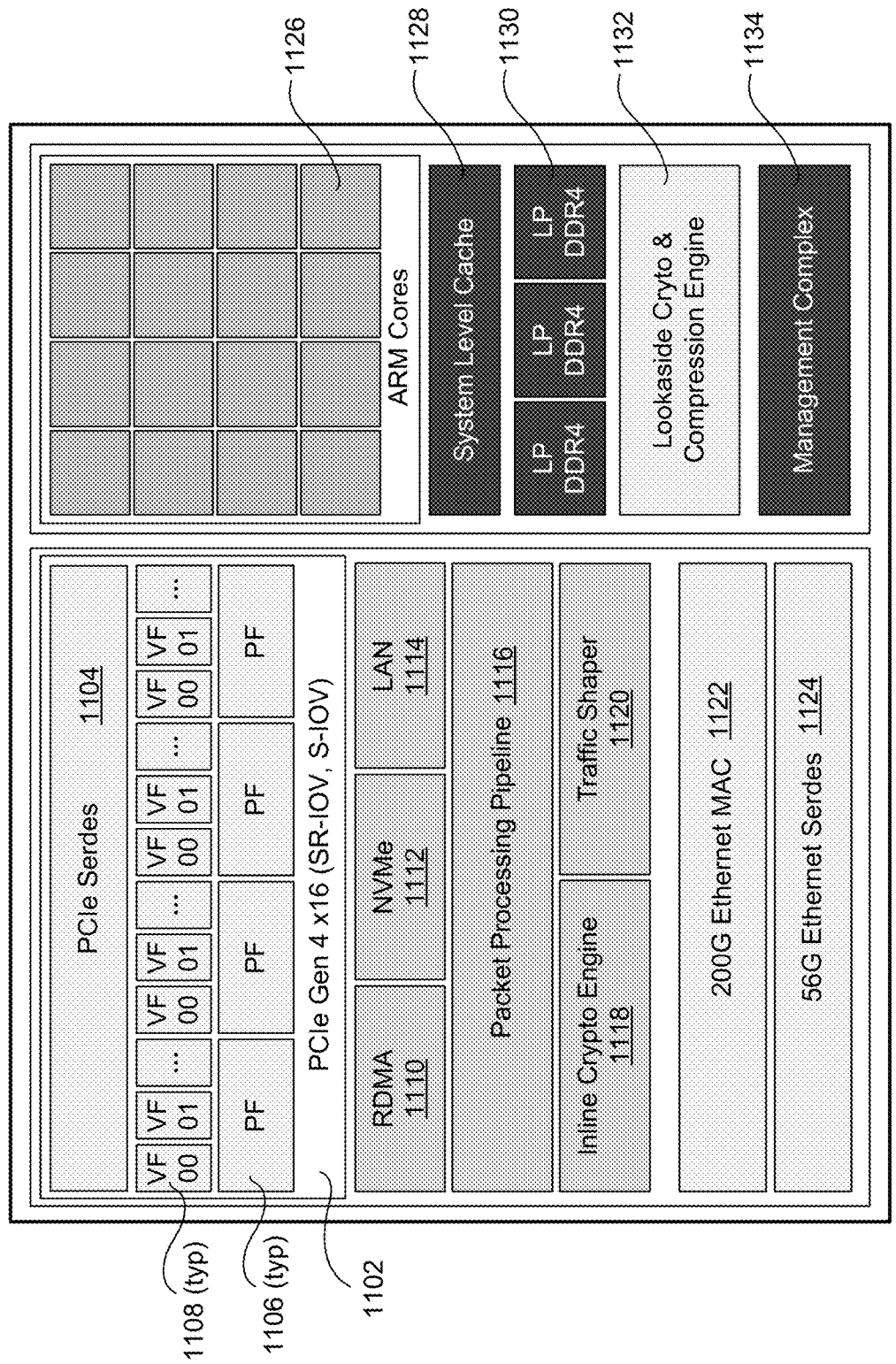
FIG. 11 is a block diagram of an exemplary IPU chip.

FIGS. 10 and 11 show exemplary embodiments of IPU circuitry. IPU 1000 in FIG. 10 is a PCIe card including a circuit board 1002 having a PCIe edge connector to which various integrated circuit (IC) chips are mounted. The IC chips include an FPGA 1004, a CPU/SoC (System on a Chip) 1006, a pair of NICs 1008 and 1010, and memory chips 1012 and 1014. The various functions and operations performed by embodiments of IPUs described and illustrated herein may be implemented by programmed logic in FPGA 1004 and/or execution of software on CPU/SoC 1006. FPGA 1004 may include logic that is pre-programmed (e.g., by a manufacturing) and/or logic that is programmed in the field. For example, logic in FPGA 1004 may be programmed by a host CPU for a platform in which IPU 1000 is installed. IPU 1000 may also include other interfaces (not shown) that may be used to program logic in FPGA 1004.

CPU/SoC 1006 employs a System on a Chip including multiple processor cores. Various CPU/processor architectures may be used, including x86 and ARM architectures. In on non-limiting example, CPU/SoC 1006 comprises an Intel® Xeon® processor. Software executed on the processor cores may be loaded into memory 1014, either from a storage device (not shown), for a host, or received over a network coupled to NIC 1008 or NIC 1010.

The dashed box in the lower portion of FIG. 10 shows an exemplary and non-limiting set of functions supported by IPU 1000, including XPU control/management 1018, a packet processing pipeline 1020, RDMA 1022, NVMe 1024 (Non-volatile Memory Express (NVMe®)), and a cryptographic engine 1026. In addition to these exemplary functions, IPU 1000 may support other functions and operations described for the IPUs herein.

FIG. 11 shows an IPU chip 1100 that may be installed on a main board of a compute platform or may be included on a daughterboard or an expansion card, such as but not limited to a PCIe card. IPU chip 1100 includes a 4$^{th}$ generation PCIe interface 1102 including 16 lanes. The PCIe PHY operations for PCIe interface 1102 include a PCIe Serdes (Serializer/Deserializer) block 1104

In the illustrated embodiment, PCIe interface 1102 supports SR-IOV (Single Root-I/O Virtualization) and S-IOV (Scalable I/O Virtualization). SR-IOV and S-IOV are facilitated by Physical Functions (PFs) 1006 and Virtual Functions 1108 that are implemented in accordance with SR-IOV and S-IOV specifications.

Next, IPU chip 1100 includes a set of IP blocks, as depicted by an RDMA block 1110, an NVMe block 1112, a LAN (Local Area Network) block 1114, a packet processing pipeline 1116, and inline cryptographic engine 1118, and a traffic shaper 1120.

IPU chip 1100 includes various circuitry for implementing one or more Ethernet interfaces, including a 200 Gigabits/second (G) Ethernet MAC block 1122 and a 56G Ethernet Serdes block 1124. Generally, the MAC and Ethernet Serdes resources in 200G Ethernet MAC block 1122 and 56G Ethernet Serdes block 1124 may be split between multiple Ethernet ports, under which each Ethernet port will be configured to support a standard Ethernet bandwidth and associated Ethernet protocol.

As shown in the upper right corner, IPU chip 1110 includes multiple ARM cores 1126 employing an ARM architecture. The ARM cores are used for executing various software components and application that may run on IPU chip 1100. ARM cores 1126 are coupled to a system level cache block 1128 which is used to cache memory accessed from one or more memory devices 1130. In this non-limiting example, the memory devices are LP DDR4 memory devices. More generally, an existing or future memory standard may be used, including those described below.

The last two IP blocks for IPU chip 1100 include a lookaside cryptographic and compression engine 1132 and a management complex 1134. Lookaside cryptographic and compression engine 1132 supports cryptographic (encryption/description) and compression/decompression operations that are offloaded from ARM cores 1126. Management complex 1134 comprises logic for implementing various management functions and operations, such as the management and control operations performed by IPUs described and illustrated here.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

In one example, the central resource manager is implemented by software instructions that are executed on a processor in a server, compute node, etc. As described and illustrated herein, the central resource manager receives/gathers capabilities and security information from the IPUs through a registration process or the like, with the information obtained from the IPUs maintained in a registry or database. Optionally, XPU capabilities and security information may be provided through the registration process or obtained separately, e.g., from one or more fNICs. During runtime, the resource manager checks for heartbeat signals and/or health status updates, or, optioning, sends pings to IPUs and listens for ping responses. Upon detection of a failed IPU or XPU, the resource manager identifies a comparable IPU or XPU (as applicable) and sends applicable configuration information to the comparable IPU or XPU that is identified.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An infrastructure processing unit (IPU), comprising:
   one or more network interface controller (NICs); and
   one or more Input/Output (I/O) interfaces;
   wherein the IPU is configured to be installed in a first compute platform including one or more other processing units (XPUs) in a first XPU cluster, wherein the compute platform is configured to be implemented in a networked environment including a plurality of compute platforms having respective IPUs and XPU clusters, and wherein the IPU is to:
   control and manage the one or more XPUs in the first XPU cluster;
   receive IPU migration information via one of the one or more NICs or via an out-of-band channel, the IPU migration information identifying a second compute platform for which an IPU has failed or has become unavailable and information to enable access to one or more XPUs in a second XPU cluster on the second platform; and
   employ the IPU migration information to control and manage the one or more XPUs in the second XPU cluster on the second platform.

2. The IPU of claim 1, wherein one or more XPUs in the second XPU cluster are connected to a NIC in the second compute platform via Input/Output (I/O) links employing a packetized I/O protocol, and wherein the IPU is further configured to:
   packetize control or management data destined for an XPU in the second XPU cluster in one or more I/O protocol packets;
   encapsulate the one or more I/O protocol packets in one or more network packets; and
   transmit the one or more network packets outbound from one of the one or more NICs onto a network to be delivered to a NIC on the second compute platform coupled to the network.

3. The IPU of claim 1, further configured to:
   detect a first XPU in the first XPU cluster has failed or has become unresponsive;
   send information to a resource manager coupled to one of the one or more NICs or via an out-of-band channel identifying the XPU that has failed;
   receive XPU migration information from the resource manager identifying a second XPU in a second compute platform to replace the first XPU, the second XPU comprising a remote XPU accessible over a network; and
   migrate a workload that was being performed on the first XPU to the remote XPU via communications sent over the network between the IPU and the second compute platform or the remote XPU.

4. The IPU of claim 3, further configured to add the remote XPU to the first XPU cluster, wherein the IPU is used to control and manage the remote XPU.

5. The IPU of claim 3, wherein the IPU is further configured to migrate the workload to the second XPU by:
   packetizing workload data destined for the second XPU in one or more Input/Output (I/O) protocol packets;
   encapsulating the one or more I/O protocol packets in one or more network packets; and
   transmitting the one or more network packets outbound from one of the one or more NICs onto a network to be delivered to a NIC on the second compute platform coupled to the network.

6. The IPU of claim 1, wherein the IPU is configured to periodically transmit a heartbeat or status update message to a resource manager coupled to the IPU via a network link or via an out-of-band channel, and wherein the heartbeat or status update message contains one of:
   a health status of the IPU; or
   a health status of the IPU and a health status of one or more of the XPUs in the first XPU cluster.

7. The IPU of claim 1, further configured to:
   determine capabilities and security information for the IPU;

enumerate the XPUs in the first XPU cluster to identify an Input/Output (I/O) address and capabilities of the one or more XPUs in the first XPU cluster; and register the IPU capabilities and security information and the I/O address and capabilities of the one or more XPUs in the first XPU cluster with a resource manager in the networked environment.

8. A method performed in a networked environment including:

a plurality of compute platforms having infrastructure processing units (IPUs), at least a portion of the plurality of compute platforms including one or more accelerators comprising other processing units (XPUs);

managing, via a first IPU on a first compute platform, one or more XPUs in a first XPU cluster on the first compute platform;

detecting the first IPU has failed or is unavailable;

identifying a second IPU on a second compute platform that is comparable to the first IPU; and migrating management of the one or more XPUs in the first XPU cluster on the first platform to the second IPU.

9. The method of claim 8, wherein the one or more XPUs on the first compute platform are used to perform one or more workloads, further comprising migrating management of the one or more workloads from the first IPU to the second IPU.

10. The method of claim 8, wherein the network environment further includes a resource manager communicatively coupled to the IPUs, further comprising:

maintaining, via the resource manager, IPU capabilities and security information in an IPU repository or registry; and in response to detection of a failure of the first IPU, the resource manager querying the IPU repository or registry to identify a comparable IPU with capabilities and security comparable to the capabilities and security of the first IPU, wherein the comparable IPU that is identified is the second IPU.

11. The method of claim 10, further comprising:

for each of at least a portion of the IPUs, registering its capabilities and security information with the resource manager, the resource manager maintaining the capabilities and security information for the IPUs that are registered in the IPU repository or registry.

12. The method of claim 10, further comprising:

one of, periodically sending a heartbeat signal from an IPU to the resource manager; and detecting the IPU has failed or is unavailable when a heartbeat signal has not been received from the IPU within a timeout period;

or sending a ping from the resource manager to an IPU; and determining an IPU has failed or is unavailable when the IPU fails to return a ping response.

13. The method of claim 8, further comprising:

detecting a first XPU in the first XPU cluster has failed or has become unresponsive;

sending information to a resource manager coupled to the first IPU via a communication link or out-of-band channel identifying the first XPU has failed;

receiving XPU migration information from the resource manager identifying a second XPU in a second compute platform to replace the first XPU, the second XPU comprising a remote XPU accessible over a network; and migrating a workload that was being performed on the first XPU to the remote XPU via communications sent over the network between the first IPU and the second compute platform or the remote XPU.

14. The method of claim 13, further comprising:

adding the remote XPU to the first XPU cluster;

and controlling and managing the remote XPU using the first IPU.

15. The method of claim 8, further comprising:

employing a network link between a first network interface controller (NIC) on the first compute platform and a second NIC on the second IPU to remotely manage the one or more XPUs on the first platform with the second IPU.

16. The method of claim 15, wherein the one or more XPUs on the first platform are connected to the first NIC via an Input/Output (I/O) interconnect employing an I/O protocol, further comprising:

for communication from an XPU on the first platform to the second IPU, generating one or more I/O protocol packets containing data to be communicated and sending the one or more I/O protocol packets from the XPU to the first NIC;

encapsulating the one or more I/O protocol packets in one or more network packets;

sending the one or more network packets from the first NIC to the second NIC via the network link; and de-encapsulating the one or more I/O protocol packets from the one or more network packets at one of the second NIC or using logic in the second IPU.

17. The method of claim 16, further comprising:

for communication from the second IPU to an XPU on the first platform, generating one or more I/O protocol packets containing data to be communicated and encapsulating the one or more I/O protocol packets in one or more network packets;

sending the one or more network packets from the second NIC to the first NIC via the network link;

de-encapsulating the one or more I/O protocol packets from the one or more network packets at the first NIC; and forwarding the one or more I/O protocol packets to the XPU.

18. A compute platform, comprising:

an infrastructure processing unit (IPU) having one or more network interface controller (NICs); and a plurality of other processing units (XPUs) coupled to the IPU via Input/Output (I/O) links and forming a first XPU cluster, wherein the compute platform is configured to be implemented in a networked environment including a plurality of compute platforms having respective IPUs and XPU clusters, and wherein the IPU is configured to:

control and manage the plurality of XPUs in the first XPU cluster;

receive IPU migration information via one of the one or more NICs or via an out-of-band channel, the IPU migration information identifying a second compute platform for which an IPU has failed or has become unavailable and information to enable access to one or more XPUs in a second XPU cluster on the second platform; and employ the IPU migration information to control and manage the one or more XPUs in the second XPU cluster on the second platform.

19. The compute platform of claim 18, wherein the IPU is further configured to:
detect a first XPU in the first XPU cluster has failed or has become unresponsive;
send information to a resource manager coupled to the compute platform via a communication link or an out-of-band channel identifying the XPU that has failed;
receive XPU migration information from the resource manager identifying a second XPU in a second compute platform to replace the first XPU, the second XPU comprising a remote XPU accessible over a network; and
migrate a workload that was being performed on the first XPU to the remote XPU via communications sent over the network between the IPU and the second compute platform or the remote XPU.

20. The compute platform of claim 19, wherein the IPU is further configured to migrate the workload to the second XPU by:
packetizing workload data destined for the second XPU in one or more Input/Output (I/O) protocol packets;
encapsulating the one or more I/O protocol packets in one or more network packets; and
transmitting the one or more network packets outbound from one of the one or more NICs onto a network to be delivered to a NIC on the second compute platform coupled to the network.

* * * * *